(12) United States Patent
Von Tish et al.

(10) Patent No.: US 11,354,493 B2
(45) Date of Patent: Jun. 7, 2022

(54) TABLE CELL EDITING IN A SPREADSHEET CONSTRAINED TO UNBOUNDED AND SEARCHABLE LISTS OF VALUES FROM WEB SERVICE

(71) Applicant: Oracle International Corporation, Redwood Shores, CA (US)

(72) Inventors: Kelsey Von Tish, Boston, MA (US); Edmund A. Davis, Acton, CA (US); Shaun Logan, Melrose, MA (US)

(73) Assignee: Oracle International Corporation, Redwood Shores, CA (US)

( * ) Notice: Subject to any disclaimer, the term of this patent is extended or adjusted under 35 U.S.C. 154(b) by 97 days.

(21) Appl. No.: 16/692,634

(22) Filed: Nov. 22, 2019

(65) Prior Publication Data

US 2020/0097534 A1 Mar. 26, 2020

Related U.S. Application Data

(63) Continuation-in-part of application No. 16/145,029, filed on Sep. 27, 2018, now Pat. No. 11,138,371.
(Continued)

(51) Int. Cl.
*H04L 67/50* (2022.01)
*G06F 40/18* (2020.01)
(Continued)

(52) U.S. Cl.
CPC .......... *G06F 40/18* (2020.01); *G06F 16/907* (2019.01); *G06F 16/958* (2019.01);
(Continued)

(58) Field of Classification Search
CPC .... G06F 16/907; G06F 16/958; G06F 40/177; G06F 40/18; H04L 67/16; H04L 67/22; H04L 67/2804; H04L 67/2823
See application file for complete search history.

(56) References Cited

U.S. PATENT DOCUMENTS 6,134,564 A * 10/2000 Listou ................... G06F 40/177
715/236
6,854,085 B1 * 2/2005 Morse ................... G06F 40/143
715/236

(Continued)

*Primary Examiner* — Gil H. Lee
(74) *Attorney, Agent, or Firm* — Trellis IP Law Group, PC

(57) ABSTRACT

An example method facilitates data entry into fields or cells of client-side programs, such as spreadsheets, using a versatile data-selection dialog that provides User Interface (UI) controls and associated user options and functionality for efficiently selecting from among lists of values or computing objects for entry into an associated field or cell. The lists can be bounded or unbounded. The listed items can also be sorted and/or searched as needed. The dialog is further supported by functionality enabling selective retrieval of server-side data for populating values in the lists and caching of the retrieved values to meet the needs of a given implementation. Additional controls enable implementing advanced searches via the dialog, where associated advance-search functionality enables, for instance, searching by ranges of values; the addition of new types of search criteria (e.g., by enabling the adding of fields to a set of advanced-search controls), and so on.

20 Claims, 22 Drawing Sheets

Related U.S. Application Data

(60) Provisional application No. 62/566,248, filed on Sep. 29, 2017, provisional application No. 62/564,938, filed on Sep. 28, 2017.

(51) Int. Cl.
| | |
|---|---|
| *H04L 67/51* | (2022.01) |
| *G06F 16/907* | (2019.01) |
| *H04L 67/561* | (2022.01) |
| *H04L 67/565* | (2022.01) |
| *G06F 16/958* | (2019.01) |
| *G06F 40/177* | (2020.01) |

(52) U.S. Cl.
CPC ............ *G06F 40/177* (2020.01); *H04L 67/16* (2013.01); *H04L 67/22* (2013.01); *H04L 67/2804* (2013.01); *H04L 67/2823* (2013.01)

(56) References Cited

U.S. PATENT DOCUMENTS

| | | | |
|---|---|---|---|
| 2006/0288267 A1* | 12/2006 | DeSpain | G06F 40/18 715/212 |
| 2007/0033536 A1* | 2/2007 | Rasmussen | G06Q 10/10 715/764 |
| 2009/0037223 A1* | 2/2009 | Green | G16H 40/63 705/3 |
| 2015/0089351 A1* | 3/2015 | Logan | G06F 3/04817 715/234 |

* cited by examiner

FIG. 3

Example Payload: Employee Data (JSON)

```
{
  "items" : [ {
    "EmployeeId" : 100,
    "FirstName" : "Steven",
    "LastName" : "King",
    "Email" : "SKING",
    "PhoneNumber" : "515.123.4567",
    "HireDate" : "2003-06-17",
    "JobId" : "AD_PRES",
    "Salary" : 24000,
    "CommissionPct" : null,
    "ManagerId" : null,
    "DepartmentId" : 90
  }, {
    "EmployeeId" : 109,
    "FirstName" : "Daniel",
    "LastName" : "Faviet",
    "Email" : "DFAVIET",
    "PhoneNumber" : "515.124.4169",
    "HireDate" : "2005-09-01",
    "JobId" : "FI_ACCOUNT",
    "Salary" : 9000,
    "CommissionPct" : null,
    "ManagerId" : 108,
    "DepartmentId" : 100
  }, ... ]
}
```

Example Payload: Job Data (JSON)

```
{
  "items" : [ {
    "JobId" : "AD_PRES",
    "JobTitle" : "President"
  }, {
    "JobId" : "FI_ACCOUNT",
    "JobTitle" : "Accountant"
  }, {
    "JobId" : "AC_MGR",
    "JobTitle" : "Accounting Manager"
  }, ... ]
}
```

| Hire Date* | Job Title* | Salary | Commission % | Manager Id | Department |
|---|---|---|---|---|---|
| 8/17/2003 | President | 24,000.00 | | | Executive |
| 9/1/2005 | Accountant | 8,000.00 | | 108 | Finance |

| Change | Status | Id* | First Name | Last Name* | Hire Date* | Job Title* | Salary |
|---|---|---|---|---|---|---|---|
| Update | | 103 | Daniel | Faviet | 8/16/2005 | Accounting Manager | 10,080.53 |

Sample Payload: Modified Employee Data (JSON)

```
{
  "EmployeeId" : 109,
  "FirstName" : "Daniel",
  "LastName" : "Faviet",
  "Email" : "DFAVIET",
  "PhoneNumber" : "515.124.4169",
  "HireDate" : "2005-09-05",     ← Changed Value
  "JobId" : "AC_MGR",            ← Changed Value
  "Salary" : 10000.53,           ← Changed Value
  "CommissionPct" : null,
  "ManagerId" : 108,
  "DepartmentId" : 100
}
```

| Change | Status | Id* | First Name | Last Name* | Hire Date* | Job Title* | Salary |
|--------|--------|-----|------------|------------|------------|------------|--------|
| | Update Succeeded | 109 | Daniel | Faviet | 8/5/2005 | Accounting Manager | 10,000.53 |

Search and Select: Manager — 76

▼ Search — 78, 80

| | | |
|---|---|---|
| Last Name | Starts With ▼ — 82 | K — 84 |
| Start Date | Before ▼ — 86 | 06/15/2011 — 88 |

Add Field — 90    Search — 92

98

| First Name | Last Name | Start Date — 42 |
|---|---|---|
| Steven | King | 06/17/2003 |
| Neena | Kochhar | 09/21/2005 |
| Lex | De Haan | 01/13/2001 |
| Alexander | Hunold | 01/03/2006 |
| Bruce | Ernst | 05/21/2007 |
| Alexander | Hunold | 01/03/2006 |
| Bruce | Ernst | 05/21/2007 |
| Bruce | Ernst | 05/21/2007 |
| Alexander | Hunold | 01/03/2006 |
| Bruce | Ernst | 05/21/2007 |

Ok — 100    Cancel — 102

FIG. 19

TABLE CELL EDITING IN A SPREADSHEET CONSTRAINED TO UNBOUNDED AND SEARCHABLE LISTS OF VALUES FROM WEB SERVICE

CROSS REFERENCES TO RELATED APPLICATIONS

This application is a continuation-in-part of the following application, U.S. patent application Ser. No. 16/145,029, entitled EDITABLE TABLE IN A SPREADSHEET INTEGRATED WITH A WEB SERVICE, filed on Sep. 27, 2018 (ORACP0205/ORA180186-US-NP), which claims priority from U.S. Provisional Patent Application No. 62/564,938, entitled EDITABLE TABLE IN A SPREADSHEET INTEGRATED WITH A WEB SERVICE, filed on Sep. 28, 2017 (ORACP0205P/ORA180186-US-PSP), and from U.S. Provisional Patent Application No. 62/566,248, entitled TABLE CELL EDITING IN A SPREADSHEET USING A CONSTRAINED LIST OF VALUES FROM A WEB SERVICE, filed on Sep. 29, 2017 (ORACP0233P/ORA180333-US-PSP), which are hereby incorporated by reference as if set forth in full in this application for all purposes.

This application is further related to U.S. patent application Ser. No. 16/560,201 (ORACP0245/ORA190245-US-NP), entitled ADAPTIVE AUTHENTICATION IN SPREADSHEET INTERFACE INTEGRATED WITH WEB SERVICE, filed on Sep. 4, 2019, which is hereby incorporated by reference as if set forth in full in this application for all purposes.

BACKGROUND

The present application relates to computing, and more specifically to software and accompanying User Interfaces (UIs) for retrieving, manipulating, and updating server-side data.

Software and accompanying UIs for finding, accessing, manipulating, and/or updating data are employed in various demanding applications, including client-side financial software, spreadsheets, websites for accessing and manipulating cloud-based business data, search engines, web services, and so on. Such applications often demand user friendly feature-rich UIs that enable users to efficiently find pertinent data, make any data modifications, and then save any changes.

However, conventional UIs often lack efficient mechanisms for enabling quick and pertinent user selections for fields or cells of a given UI, such as a spreadsheet UI. For example, conventional UIs often rely upon drop-down menus for making field selections. Conventional drop-down menus can be suitable for selecting from among few choices, but can become particularly problematic when selecting from many choices, e.g., hundreds or thousands of choices.

When a given software task requires user selections from among many choices, separate software packages and associated UIs, e.g., search engine UIs, can be activated. However, switching between UIs and associated software packages can be excessively cumbersome. Furthermore, the user may lose focus as their attention gets diverted to different UIs.

SUMMARY

An example method facilitates data selection and data entry into fields or cells of client-side programs, such as spreadsheets, using a versatile data-selection dialog that provides User Interface (UI) controls and associated user options and functionality for efficiently selecting from among lists of values or computing objects for entry into a field or cell used to trigger (or that is otherwise associated with) display of the data-selection dialog. The lists can be bounded or unbounded and can be sorted and/or searched as needed.

The dialog is further supported by functionality enabling selective retrieval of server-side data for populating values in the lists and caching of the retrieved values for subsequent rapid access thereto. Additional controls enable implementing advanced searches via the dialog, where associated advance-search functionality enables, for instance, searching by ranges of values; the addition of new types of search criteria (e.g., by enabling the adding of fields and associated UI controls to a set of advanced-search controls), and so on.

Accordingly, the example method facilitates data retrieval, selection, and entry in a client-side spreadsheet and includes: detecting user selection of a cell of the spreadsheet; displaying a data-selection dialog (wherein the data-selection dialog may also represent a data-entry dialog, search dialog, etc.) in response to the detecting, wherein the data-selection dialog further includes: a listing of selectable items; one or more first UI controls for selecting items from the listing of selectable items; one or more second UI controls for selectively sorting the listing of selectable items in accordance with a first user-specified criterion; and one or more third UI controls for selectively searching the listing of selectable items in accordance with a second user-specified criterion.

The specific example method further includes: detecting use of the one or more first UI controls; the one or more second UI controls; and the one or more third UI controls, and either selecting an item from the listing of selectable items, sorting of the listing of selectable items in accordance with the first user-specified criterion, or searching the listing of selectable items, respectively, in accordance with the second user-specified criterion.

In a more specific embodiment, the data-selection dialog represents a modeless data-selection dialog that includes the listing of selectable items. The listing of selectable items is arranged in rows of a table, wherein each row of the table represents a selectable item. The table includes one or more rows of selectable items and one or more columns of sub-items for each selectable item. The listing of selectable items may be bounded or unbounded.

The first specified criterion may specify, for instance, sorting of the selectable items by a header of the one or more columns. The header may include, for instance, a date header, enabling sorting of the selectable items by date. The header may further include a name header identifying a column of the data-selection dialog. Selection of a name header may result in alphabetical sorting of the listing of selectable items by name.

The specific example method may further include providing one or more fourth UI controls for triggering display of one or more advanced-search UI controls in the data-selection dialog, thereby updating the data-selection dialog to represent an advanced-search dialog. The advanced-search dialog may further include one or more fourth UI controls for providing user options to enter multiple search criteria. The advanced-search dialog may further include one or more fifth UI controls for enabling addition of one or more sixth UI controls to the advanced-search dialog. The one or more sixth UI controls may enable a user to specify additional search criteria, in addition to the multiple search criteria.

The specific example method may further include use of server-side metadata and client-side UI metadata to facilitate selective retrieval of server-side data for use in the data-selection dialog (including the advanced-search dialog). Each data-selection dialog may present a virtualized version of data available from a server (or client-side cache) for a spreadsheet cell entry.

Accordingly, the specific example method may further include determining items in the listing of selectable items by: accessing metadata pertaining to a web service from which the spreadsheet is to obtain data for a selected field of the spreadsheet; obtaining data for a particular cell of the spreadsheet in accordance with the metadata, resulting in obtained data; using the metadata to populate the data-selection dialog with the listing of selectable items in accordance with the obtained data and associated metadata; and selectively caching the obtained data for future use.

The specific example method may further include determining that a user has scrolled past retrieved data in the listing of selectable items, and then: selectively retrieving additional data from the web service in accordance with the metadata; and augmenting the listing of selectable items with the additional data retrieved via the web service. This facilitates use of lists (in the data-selection dialogs) that need not be specifically bounded or limited in length (i.e., may be arbitrarily long, depending upon data available from the server).

Hence, certain embodiment discussed herein may provide functionality that greatly facilitates user selections of data for entry into cells of client-side software, such as spreadsheets. The functionality includes sorting, searching, and selective retrieval of server-side data to enhance flexibility and capability of the data-selection dialog and associated user experience.

Note that conventionally, data-selection dialogs or controls (e.g., drop-down menus) were often limited to short lists of values. Lists with longer than approximately 20 entries were problematic, requiring the user to scroll through several items before making a selection. Furthermore, the conventional data-selection dialogs or controls often lacked functionality for displaying tables with different display values; exhibited poor support for non-string data (e.g., dates, numeric data, etc.); lacked means for invoking advanced searches from the drop-down controls, and so on.

Embodiments discussed herein provide an efficient mechanism (including the data-selection dialog) for enabling users to quickly select data items or objects (e.g., for entry into a client-side spreadsheet cell) from bounded or unbounded searchable lists of values.

By providing options to filter, sort, and search bounded (constrained) or unbounded (unconstrained) lists of values for table cell entries as disclosed herein, this facilitates use of longer constrained lists (e.g., with 300 or more items) or even unbounded lists, while enabling efficient data-selections and entries from data of the lists.

Accordingly, various embodiments discussed herein may provide a unified data-selection and entry user experience. The user can employ a similar UI (e.g., data-selection dialog) for both short and long lists of values. The data-selection dialog can replace conventional drop-down menus, which tend to provide limited functionality and flexibility.

A single UI (e.g., data-selection dialog) can now efficiently handle long and/or short lists of values and can allow searching, sorting, and selection of values, without requiring the user to use another program, UI, or dialog to implement such data searches. Use of data-selection dialogs as discussed herein may provide an efficient and user friendly data picker experience that is congruous or integrated with the spreadsheet experience.

A further understanding of the nature and the advantages of particular embodiments disclosed herein may be realized by reference of the remaining portions of the specification and the attached drawings.

BRIEF DESCRIPTION OF THE DRAWINGS

FIG. 3 illustrates an example spreadsheet User Interface (UI) display screen, according to some implementations.

FIG. 5 illustrates example payload employee data retrieved from a web service, according to some implementations.

FIG. 6 illustrates example payload job data retrieved from a web service, according to some implementations.

FIG. 7 illustrates example fields of a spreadsheet with converted display values, according to some implementations.

FIG. 9 illustrates example fields of a spreadsheet with changed display values, according to some implementations.

FIG. 10 illustrates an example package of converted display values in a JSON format, according to some implementations.

FIG. 11 illustrates example fields of the spreadsheet of FIG. 9 with changed display values and an update succeeded indicator, according to some implementations.

FIG. 14 illustrates example portion of a spreadsheet, according to some implementations.

FIG. 19 illustrates a second updated version of the first UI display screen of FIG. 17, where the first enhanced data-selection dialog of FIG. 17 has been updated after a user has selected an advanced-search option therein, resulting in a second updated data-selection dialog.

DETAILED DESCRIPTION OF EMBODIMENTS

Figure 1:
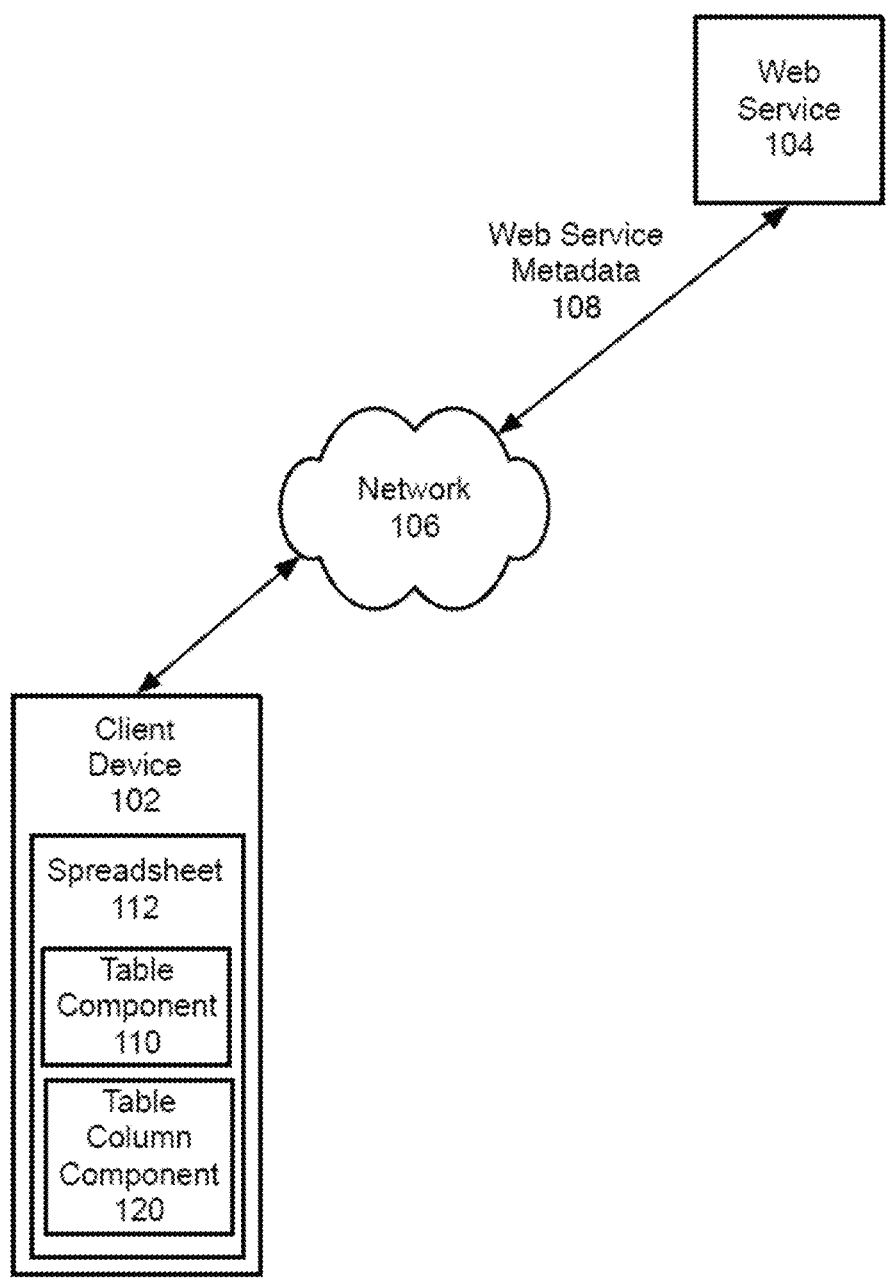
FIG. 1 illustrates a first block diagram of an example application environment, which may be used for implementations described herein.

Conventional web services offer to retrieve server-side business data (e.g., cloud-based data) that is displayable in a spreadsheet (e.g., a client-side spreadsheet). However, if a business user wants to make changes to the spreadsheet data, extensive and highly-skilled programming is often required to transmit the changes back to the web service.

Currently, efficient mechanisms for integrating non-browser client-side software and server-side web services are virtually nonexistent. Conventionally, in a spreadsheet for instance, if a particular cell is limited to a particular set of values (called a constrained list of values), the user may select on or more of the values for the cell entry. However, existing methods, such as involving the use of drop-down menus, tend to provide limited user options. The need for efficient mechanisms to enable unbounded and searchable lists of values for selections of table cell entries is address by certain embodiments discussed herein.

Embodiments for facilitating updating server-side data using a client-side spreadsheet generally relate to a spreadsheet add-in that enables business users with no previous programming experience to rapidly integrate spreadsheets with web applications in order to retrieve, analyze, and edit data. Implementations interrogate a given web service to obtain its metadata. Implementations analyze the web service metadata to determine the capabilities of the web service. This metadata may then be used to automatically configure an editable table component in a spreadsheet. This table component may then be used to retrieve data, edit that data in a spreadsheet, and then upload changes back to the web service.

As described in more detail herein, a system interrogates a given web service to obtain its metadata. The system then determines one or more capabilities of the web service based on the web service metadata. The system then configures a table component in a spreadsheet based on one or more capabilities and the web service metadata. The table component may be used to retrieve data, edit that data in a spreadsheet, and then upload changes back to the web service. In various implementations, the system tracks data changes in the spreadsheet based on user input. The system then sends the data changes from the spreadsheet to the web service.

In addition to retrieving and analyzing web service metadata, implementations automatically configure the table component based on the metadata. As described in more detail herein, in various implementations, the system leverages the web service metadata and the table configuration to provide a user with automatically formatted information, and conveniently uploads changes to the information from the spreadsheet to the web service.

Other implementations generally relate to a spreadsheet add-in that provides a constrained list of display values from a web service. The spreadsheet add-in interrogates a given web service to obtain its metadata. The metadata is then used to automatically configure a table column component in a spreadsheet. For table columns whose attribute values are constrained to a list of allowable data values, the column component automatically constrains the list of display values that are displayed in cells and that may be chosen for the cells. The table column then maps those chosen display values to a corresponding set of data values that are sent back to the web service.

The following are definitions to provide further context and applications of implementations described herein. In various implementations, an enterprise may be any organization of persons, such as a business, university, government, military, and so on. The terms "organization" and "enterprise" are employed interchangeably herein. A talent management system or application may be any software application or functionality for facilitating selecting, organizing, or managing enterprise personnel or tasks performed thereby. Personnel of an organization may include any persons associated with the organization, such as employees, contractors, board members, and so on.

Software functionality may be any function, capability, or feature, e.g., stored or arranged data, that is provided via computer code, e.g., software. Generally, software functionality may be accessible via use of a user interface (UI), and accompanying user interface controls and features. Software functionality may include actions, such as retrieving data pertaining to a business object; performing an enterprise-related task, such as promoting, hiring, and firing enterprise personnel, placing orders, calculating analytics, launching certain dialog boxes, performing searches, and so on.

In various implementations, a UI control may be any displayed element or component of a UI display screen, which is adapted to enable a user to provide input, view data, and/or otherwise interact with a UI. Additional examples of UI controls include buttons, drop down menus, menu items, tap-and-hold functionality, and so on. Similarly, a UI control signal may be any signal that is provided as input for software, where the input affects a UI display screen and/or accompanying software application associated with the software.

A UI display screen may be any software-generated depiction presented on a display. Examples of depictions include windows, dialog boxes, displayed tables, and any other graphical UI features, such as UI controls, presented to a user via software, such as a browser. A UI display screen contained within a single border is called a view or window. Views or windows may include sections, such as sub-views or sub-windows, dialog boxes (also simply called dialogs herein), graphs, tables, and so on. In certain cases, a UI display screen may refer to all application windows presently displayed on a display. The terms UI display screen and screen may be employed interchangeably herein.

A UI display screen generated by a networked software application and accessible via a browser is called an application page (or simply page) herein. A UI component may be an application page or collection of related or linked pages.

An enterprise computing environment may be any collection of computing resources of an organization used to perform one or more tasks involving computer processing. An example enterprise computing environment includes various computing resources distributed across a network, and may further include private and shared content on intranet web servers, databases, files on local hard discs or file servers, email systems, document management systems, portals, and so on.

Enterprise software may be any set of computer code that is adapted to facilitate implementing any enterprise-related process or operation, such as managing enterprise resources, managing customer relations, and so on. Example resources include human resources (HR) (e.g., enterprise personnel), financial resources, assets, employees, business contacts, sales data, and so on, of an enterprise. Examples of enterprise software include enterprise resource planning (ERP) software for facilitating managing enterprise activities (e.g., product planning, inventory management, marketing, sales, and so on). Example ERP applications include customer relationship management (CRM), human capital management (HCM), business intelligence (BI), enterprise asset management, enterprise asset management, corporate performance and governance applications, and so on.

The terms "enterprise software" and "enterprise application" may be employed interchangeably herein. However, an enterprise application may include one or more enterprise software modules or components, such as UI software modules or components.

Note that conventionally, while certain financial tools, tables, and so on (e.g., balance sheets, cash flow statements, etc.), are standardized, different companies may prefer to maintain and view operational and financial planning data and tasks differently, e.g., in accordance with different business and computing environment requirements. This can be particularly true at granular levels, i.e., where detailed enterprise data must be observed and analyzed in accordance with business planning objectives.

For example, a particular service company may experience substantial compensation expenses (e.g., payments to employees, contractors, etc.), which may represent the primary driver for expense planning. Similarly, a small consulting company may experience substantial travel expenses, which may represent a primary driver for expense planning. Accordingly, two different service companies may base their expense planning on substantially different drivers.

Similarly, different companies may employ different methods of accounting, e.g., a direct method or indirect method of accounting. Accordingly, different companies may rely upon different drivers for handling accounting details.

Furthermore, the granularity of planning (i.e., the level of detail demanded or required) may vary across different companies and/or business types, segments, or other domains. For example, a fast moving consumer goods company may plan revenue by product, market, channel, and segment, whereas an information technology (IT) company may plan revenue by service, market, and customers. Accordingly, different companies may rely upon different drivers for various types of planning.

In addition, while certain companies may prefer to perform business planning using a collection of standard or common drivers and associated software modules and functionality (e.g., standard labor, material, etc.), other companies may prefer to perform direct entry for project expenses, revenue, etc.

Accordingly, different businesses may have different planning requirements or needs, which can be difficult to meet using conventional static business planning modules and associated software applications. Certain implementations discussed more fully below provide systems and accompanying mechanisms and methods for enabling dynamic adaptation of an existing initial business planning model (which may be called a seed model herein), thereby enabling the initial seed planning model to uniquely grow to meet individual or specific needs of a given business or organization.

For clarity, certain well-known components, such as hard drives, processors, operating systems, power supplies, routers, Internet service providers (ISPs), identity management systems, workflow orchestrators, process schedulers, integration brokers, tenant automation systems (TASs), online analytical processing (OLAP) engines, certain web services, virtual machines, middleware, enterprise databases, and so on, are not necessarily explicitly called out in the figures. However, those skilled in the art with access to the present teachings will know which components to implement and how to implement them to meet the needs of a given implementation.

FIG. 1 illustrates a block diagram of an example application environment 100, which may be used for implementations described herein. Shown are a client device 102 and a web service 104, which may communicate with each other via a network 106. In various implementations, client device 102 runs an application for spreadsheets. As such, client device 102 may create and process spreadsheets such as spreadsheet 112, which includes a table component 110 and table column component 120. In various implementations, client device 102 may access services and data directly from the web service 104. Example implementations associated with application environment 100 are described in more detail herein.

For ease of illustration, FIG. 1 shows one block for each of the client device 102, web service 104, and network 106. These blocks 102, 104, and 106 may represent multiple client devices, web services, and networks. While the client device 102 performs embodiments described herein, in other embodiments, any suitable component or combination of components associated with client device 102 or any suitable processor or processors associated with client device 102 may facilitate performing the embodiments described herein. In various embodiments, the environment 100 may not have all of the components shown and/or may have other elements including other types of components instead of, or in addition to, those shown herein.

Figure 2:
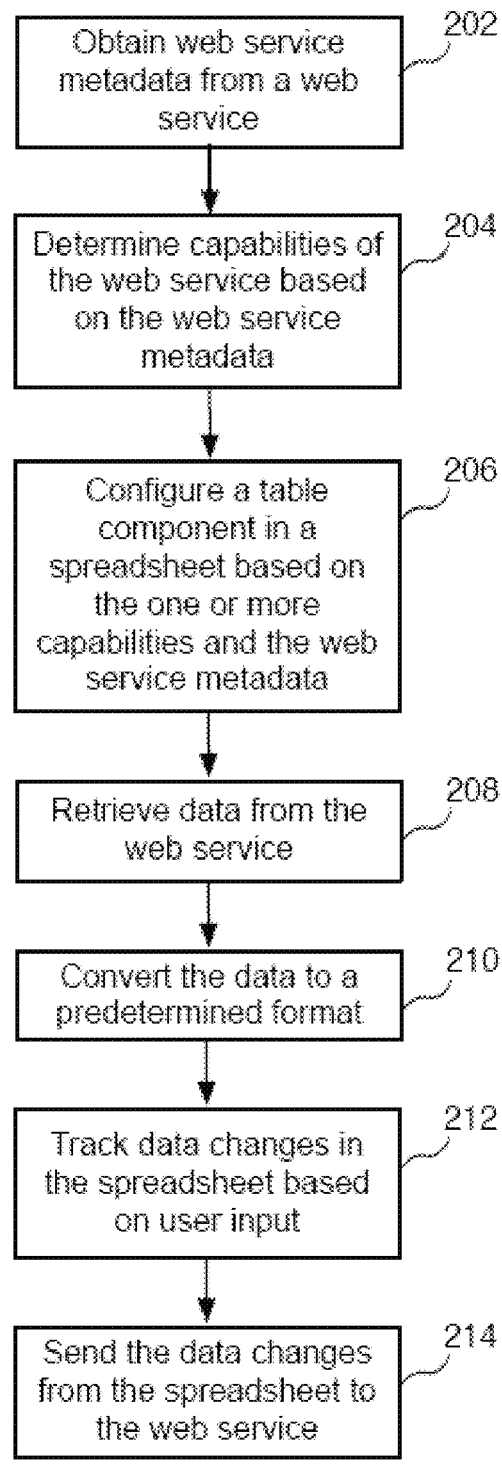
FIG. 2 illustrates a first example flow diagram for editing spreadsheets, according to some implementations.
Figure 4:
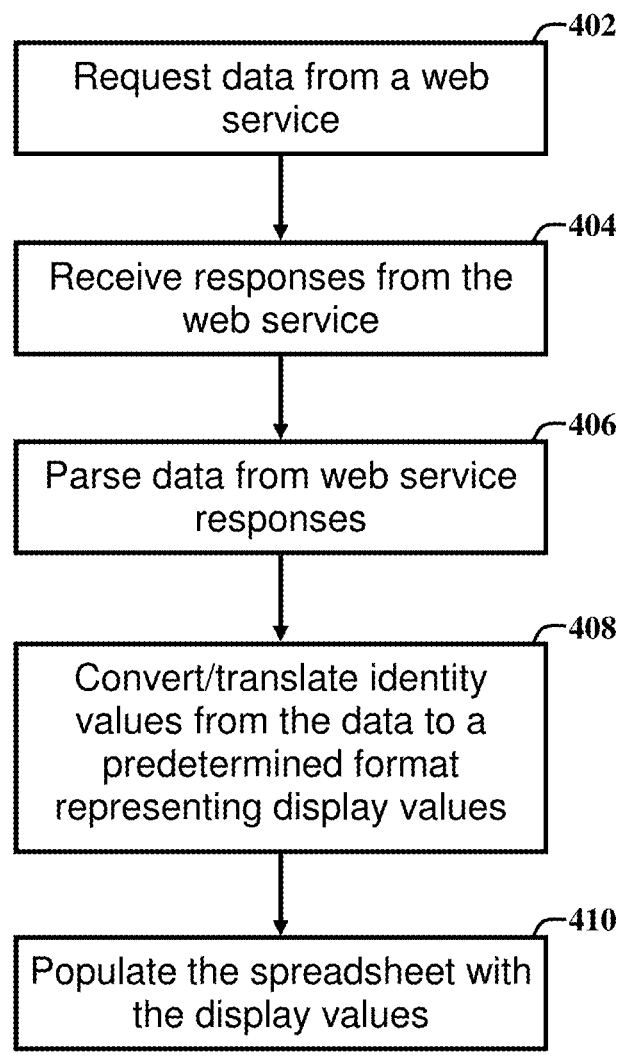
FIG. 4 illustrates a second example flow diagram for downloading data to a spreadsheet, according to some implementations.

FIG. 2 illustrates a first example flow diagram for editing a spreadsheet, according to some implementations. As described in more detail herein, implementations enable users with no previous programming experience to rapidly integrate spreadsheets with web applications in order to retrieve, analyze, and edit data. Implementations enable users to create and use ad-hoc graphical user interfaces (GUIs) in a spreadsheet without any dependency on web application development teams to create the GUI. FIG. 2 generally describes operations of both a development phase (e.g., blocks 202 to 206) and a runtime phase (e.g., blocks 208 to 214), where a spreadsheet that is configured to receive data from a web service and configured to present data to a user in a user-friendly format. FIG. 4 describes operations of a runtime phase, where the spreadsheet receives data from the web service and presents the data to the user.

With reference to FIGS. 1 and 2, at block 202, a system, such as the client device 102 of FIG. 1, obtains web service metadata 108 from a web service 104. In some implementations, the client device 102 may contact the web service 104 via a Uniform Resource Locator (URL). In some implementations, the URL may be provided by a user via a UI display screen field.

In various implementations, the client device 102 interrogates the web service 104 of FIG. 1 to obtain web service metadata 108. In various implementations, web service metadata 108 provides a description of what services and resources (also referred to as business objects) that the web service 104 provides. Sets of multiple resources or business objects may also be referred to as resource collections. For example, a resource collection may involve employee information (e.g., employee resource collection). In another example, an employee resource collection may include employee information such as first name, last name, email, phone number, hire date, job title, salary, department, etc. While example implementations are described herein in the context of employee information, implementations described herein may apply to other types of resources collections such as sales information, inventory information, weather information, etc.

In some implementations, the web service 104 may be a REpresentational State Transfer (REST) service. In various implementations, a REST or RESTful service provides interoperability between computer systems on the Internet. REST-compliant web services enable requesting systems such as the client device 102 to access and manipulate textual representations of web resources using a uniform and predefined set of stateless operations. In various implementations, the client device 102 sends a request to the web service 104 requesting metadata 108, and the web service 104 then responds to the client device 102 by sending the metadata 108 to the client device 102.

At block 204, the system 100 of FIG. 1 determines one or more capabilities of the web service 104 based on the web service metadata 108. In various implementations, the system 100 of FIG. 1 analyzes the web service metadata 108 to determine one or more capabilities of the web service 104. In some implementations, the capabilities of the web service 104 are indicated in the web service metadata 108. In various implementations, one or more of the capabilities of the web service 104 may include the capability of providing different types of data or attributes for a spreadsheet. For example, the web service 104 may provide data to the spreadsheet (e.g., an empty table) running on the client device 102. In another example, the web service 104 may provide attributes for the spreadsheet, where an attribute may have particular properties that govern the behavior of the spreadsheet. For example, properties may include whether data in a field can be changed, whether data is mandatory, etc. In some implementations, attributes may be associated with an employee. Note that the terms "attribute," "resource attribute," "field," and "business object field" may be used interchangeably. In some implementations, attributes may include first name, last name, email address, etc.

In some implementations, properties may include whether a user can insert new entries, update existing entries, whether particular data is read-only, etc. The terms "properties" and "resource properties" may be used interchangeably. In some implementations, an attribute, such as employee IDentification (ID), may be created when a new record associated with an employee is created, and may be read-only for an existing employee. In some implementations, resource properties indicated in metadata may exist at the attribute (field) level and also at the resource collection level. For example, an employee resource collection may or may not support a delete operation that would allow an existing employee to be deleted from the web service.

As described in more detail herein, in various implementations, these capabilities govern the behavior of a table component and columns associated with the table component during run time.

In some implementations, the client device 102 displays the capabilities to a user, such as an administrator. As described in more detail herein, implementations may enable the user to make some modifications to the information. For example, as described in more detail herein, implementations may enable a user to add or remove columns, or enable a user to change the wording (label) of a (column) header, etc.

At block 206 in FIG. 2, the system, such as the client device 102 of FIG. 1, configures a table component 110 in a spreadsheet 112 based on the one or more capabilities indicated via the web service metadata 108. In some implementations, to configure the table component 110 in the spreadsheet 112, the client device 102 automatically configures, without user intervention, the table component 110 based on the web service metadata 108. As indicted herein, in various implementations, the web service metadata 108 indicates attributes and properties associated with the particular table component 110. In the present example embodiment, the table component 110 includes such attributes and properties that govern characteristics, such as table-component formatting, styling, etc. The table component 110 then applies the attributes and properties to particular cells in a spreadsheet. Example implementations are described in more detail herein in connection with FIG. 3.

In some implementations, configuring the table component 110 based on the web service metadata 108 enables the table component 110 in the spreadsheet 112 of FIG. 1 to map attributes (e.g., first name, last name, email address, etc.) to columns of the spreadsheet 112 when the table component 110 is inserted into the spreadsheet 112.

Figure 3:
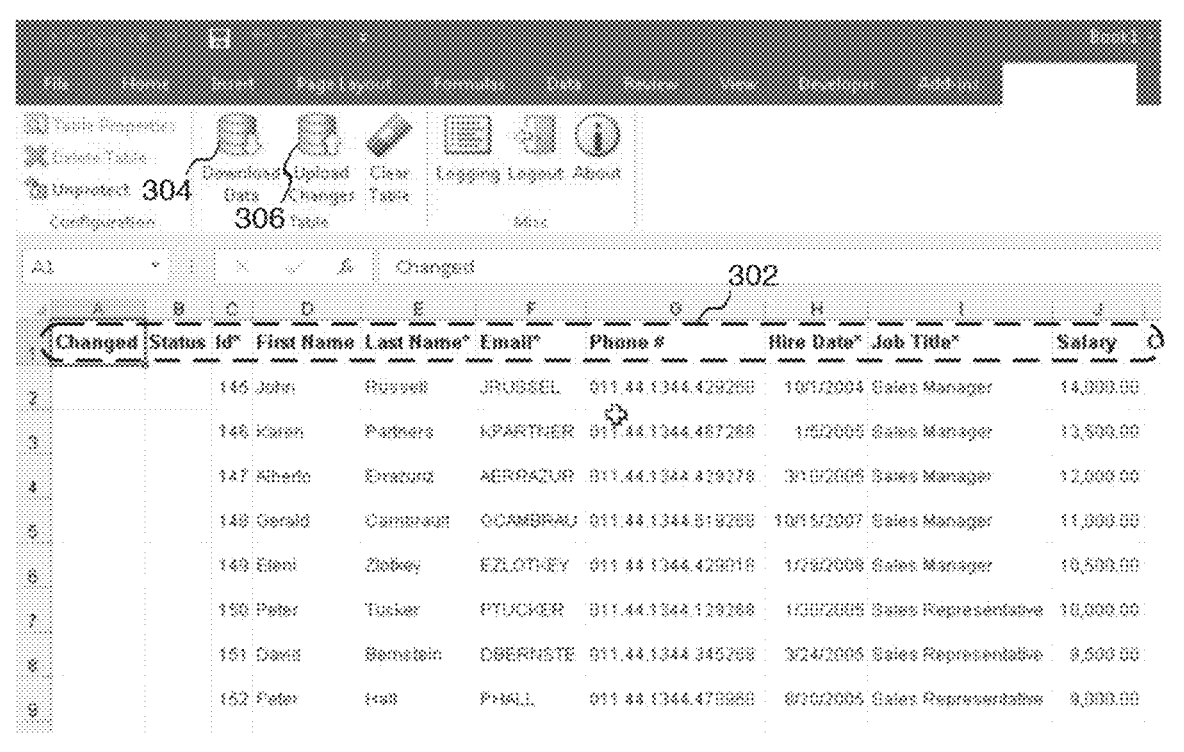

FIG. 3 illustrates an example User Interface (UI) display screen of an example spreadsheet 112 of FIG. 1, according to some implementations. In various implementations, the client device 102 of FIG. 1 configures the table component 110 in the spreadsheet 112 to automatically render columns and fields, and to populate the cells associated with attributes (e.g., characterizing fields) with data in a particular format. For example, shown are headers 302, where each header 302 indicates a particular type of information or attribute, such as first name, last name, email, phone number, hire date, job title, salary, etc. During the configuration process, the table component 110 maps the attributes to particular columns (A-J), as well as applying formatting to specific fields in the columns of the spreadsheet 112.

An example header is Phone#, which may represent a display name (or label). The display name Phone# may correspond to a field name (identifier), i.e., PhoneNumber, provided by the web service 104 of FIG. 1. In various implementations, the table component 110 automatically renders a more readable displayed name (e.g., Phone#) rather than a potentially less readable field name (e.g., PhoneNumber). Also, in FIG. 3, a symbol such as an asterisk (e.g., "*"), indicates that the data in the field is mandatory.

In some implementations, particular attributes may have read-only properties. For example, phone numbers may be read-only, which means the end user cannot change the phone numbers. But, the user can view the phone numbers. In some implementations, the table component 110 may visually indicate to the user that particular columns are read-only. For example, the table component 110 may show fields in a particular column (e.g., the phone number column) in a different color or darker than other columns. In addition to formatting, implementations may activate a spreadsheet's ability to prevent the user from altering the contents of certain cells. For example, each cell may have a "locked" property. In some implementations, a worksheet may be protected and locked, such that cells thereof cannot be edited. Some implementations may handle both the locked properties of cells and a protection mode of worksheets automatically based on the web service metadata, e.g., the web service metadata 108 of FIG. 1.

In various implementations, the spreadsheet 112 may include a download-data button 304 for downloading data from a particular source, such as the web service 104 of FIG. 1. As described in more detail herein, during runtime, in response to the user selecting download-data button 304 of FIG. 3, the client device 102 of FIG. 1 proceeds to retrieve data from the web service 104. In various implementations, the table component 110 automatically applies attributes, such as formatting, as well as functions, to data when the data is downloaded to the spreadsheet 112. For example, the headers 302 may be automatically rendered in a particular font and bolded in order to be distinguished from information under the headers. In various implementations, the table component 110 determines what information is numbers, dates, strings, etc., and then applies attributes accordingly. As described in more detail herein, the table component 110 automatically applies formatting, including styles, based on the web service metadata 108 of FIG. 1. The table component 110 also applies other properties of the columns (e.g., properties indicating whether the data in that column is editable, whether it is required or cannot be empty, etc.) in the table. Consequently, an administrator user need not make changes to table component 110, and the business user need not make changes to the attributes of the presented information. In some implementations, the client device 102 of FIG. 1 may enable a user, such as an administrator, to make some changes to the attributes of the table component 110 (e.g., modifying a displayed header, etc.).

With reference to FIGS. 1 and 2, at block 208 of FIG. 2, the client device 102 retrieves (payload) data from the web service 104 of FIG. 1. Example implementations are described in more detail herein in connection with FIG. 4.

At block 210, the client device 102 of FIG. 1 converts the retrieved data into a predetermined format. In various implementations, the predetermined format is a format that is acceptable to the spreadsheet 112 of FIG. 1 and is human readable. Example implementations are described in more detail herein in connection with FIG. 4.

At block 212 of FIG. 2, the client device 102 of FIG. 1 tracks data changes in the spreadsheet 112 based on user input. In some implementations, the user may pull data into the spreadsheet 112 and then edit the data. For example, the user may add, delete, or otherwise alter data, etc.

In various implementations, the client device 102 sends a request to the web service 104 of FIG. 1 requesting data web service 104 then responds to the client device 102 by sending the requested data to the client device 102. In various implementations, data that is imported or populated into the spreadsheet 112 of FIG. 1 may be sourced from various databases that supply data to different fields of the spreadsheet 112. In various implementations, these databases may pass such data through the web service 104 of FIG. 1 to the client device 102.

At block 214 of FIG. 2, the client device 102 of FIG. 1 sends any data changes from the spreadsheet 112 to the web service 104. With reference to FIG. 3, in some implementations, the spreadsheet UI display screen 112 may include an upload changes button 306 for uploading the data changes from spreadsheet 112 to the web service 104 of FIG. 2. Example implementations are described in more detail herein in connection with FIG. 8.

Although the steps, operations, or computations may be presented in a specific order herein, the order may be changed in particular implementations. Other orderings of the steps are possible, depending on the particular implementation. In some particular implementations, multiple steps shown as sequential in this specification may be performed simultaneously. Also, some implementations may not have all of the steps shown and/or may have other steps instead of, or in addition to, those shown herein.

FIG. 4 illustrates a second example flow diagram for downloading data to a spreadsheet, such as the spreadsheet 112 of FIG. 1, according to some implementations. As described in more detail herein, the flow of FIG. 2 generally describes operations of a runtime phase, where the client device 102 of FIG. 1 receives data from a web service (e.g., the web service 104 of FIG. 2); converts the data; and then presents the data to the user via an accompanying spreadsheet UI display screen, such as that shown in FIG. 3. In various implementations, the client device 102 of FIG. 1 converts the data from web service encoding to spreadsheet encoding as well as translates IDentification (ID) values (also called identity values herein) to display values (also called converted identity values herein, or identity values that have been converted) during download operations. This flow diagram may correspond to and provide example details for the block 208 of FIG. 2, where the client device 102 of FIG. 1 retrieves (payload) data from the web service 104 of FIG. 1.

For the purposes of the present discussion, identity values may be any values associated with or representing data that can be used to determine values to display in a spreadsheet, where the values displayed in the spreadsheet are called display values (which are displayed in a predetermined format). When determining display values based on identity values, the identity values are said to be converted to or translated to display values or to a predetermined format characterizing or representing the display values. For example, in a use case scenario involving employee information retrieved from web service(s) 104 of FIG. 1 or FIG. 16 (where the service(s) include an employee service for providing the employee information) by a spreadsheet add-in (e.g., block 14 of FIG. 16) of the client device 102, one of the fields or attributes of the retrieved employee information may be Job ID. The employee information fetched from the web service 102 of FIG. 1 or FIG. 16 may include a list of employees associated with corresponding Job ID values. The Job ID values may be mere numbers representing identity values. The identity values identify the associated job.

Figure 16:
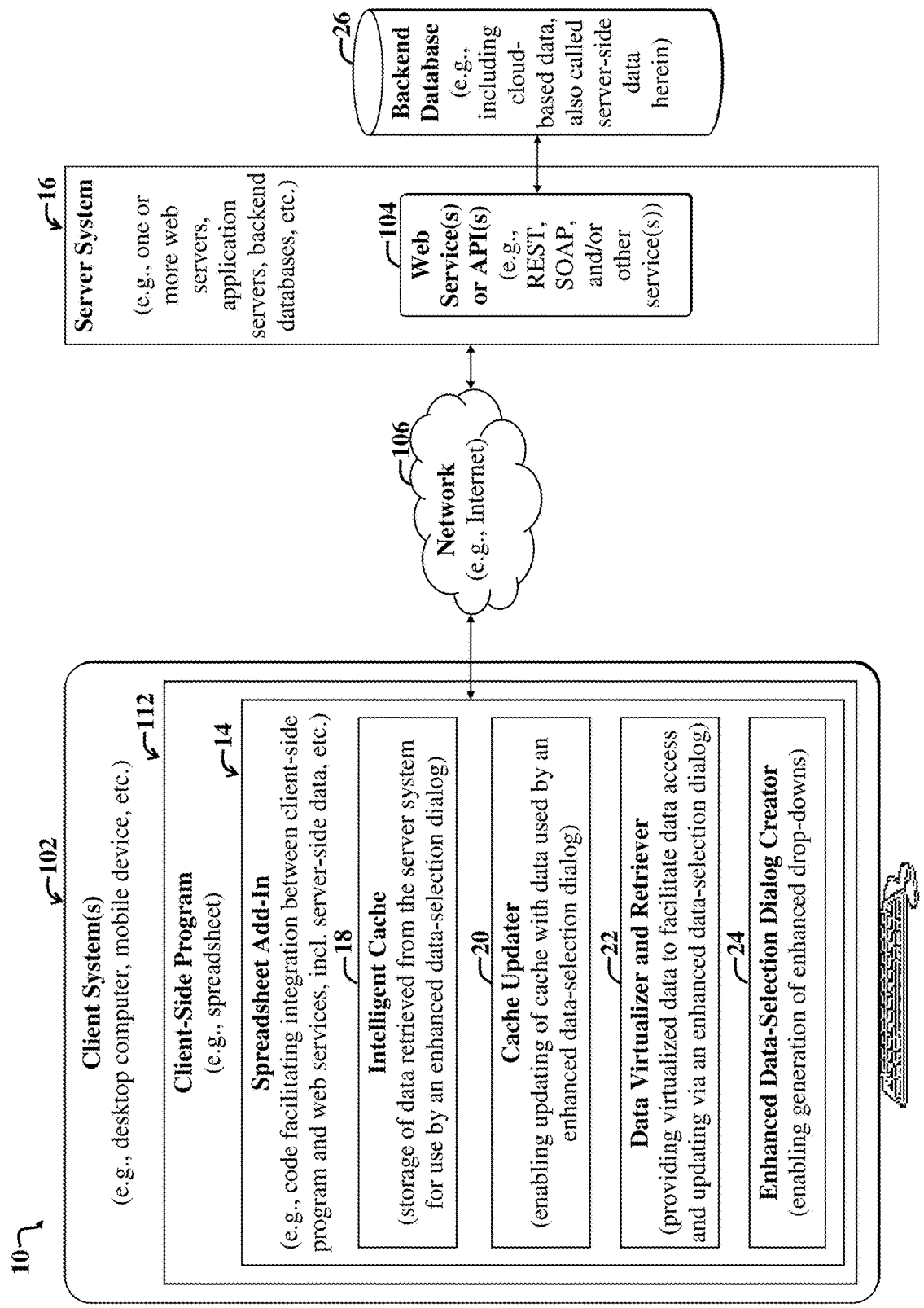
FIG. 16 illustrates a second block diagram showing an example system and accompanying computing environment employing a client-side add-in to augment the spreadsheet with functionality for facilitating efficient user selections for spreadsheet cells, where selections may be made from bounded and/or unbounded lists based, in part on communications with a server system.

The spreadsheet add-in (e.g., the add-in 14 of FIG. 16) may then call a jobs web service (which may also be implemented via the web service(s) and/or APIs 104 of FIGS. 1 and 16) to fetch job information. The fetched job information may include a list of jobs, where each job is associated with a Job ID, Job Title, Grade Level, etc. The Job Title is then used by the spreadsheet add-in (e.g., the add-in 14 of FIG. 16) to represent a display value, e.g., "Sales Manager" to be displayed in the spreadsheet 112. Accordingly, the Job ID identity value is said to be first retrieved and then "converted to" or "translated to" the particular job title, e.g., "Sales Manager," which represents a predetermined format, e.g., a text string comprising the name of the job (i.e., represents the display value).

Accordingly, in the present example scenario, during a download operation (e.g., involving updating the spreadsheet 112 of FIGS. 1 and 16 server-side data, also called cloud-based data herein), the spreadsheet add-in retrieves employee Job IDs representing identity values; then converts or translates the retrieved identity values into, e.g., Job Titles. This process is discussed more fully below with reference to FIG. 4.

During an upload operation, the spreadsheet add-in converts the display values (e.g., Job Titles) back into identity values (e.g., Job IDs), so as to facilitate updating the employee data of an employee service (e.g., that is included among the web service(s) 104 of FIG. 16) used to retrieved the Job IDs. This process is discussed more fully below with reference to FIG. 8.

With reference to FIG. 4, at block 402, a system, such as client device 102 of FIG. 1, requests data from the web service 104 of FIG. 1. As indicated above, the client device 102 may provide a download-data button (e.g., download data-button 304 of FIG. 3) for downloading data from the web service 104 of FIG. 2. In response to the user selecting download-data button 304 of FIG. 3, the client device 102 of FIG. 1 proceeds to request data from the web service 104 of FIG. 1.

At block 404 of FIG. 4, the client device 102 receives responses from the web service 104 of FIG. 1. The responses include (payload) data to be imported to a spreadsheet. Block 408 includes converting or translating identity values from the data (e.g., Job IDs) to a predetermined format representing display values (e.g., Job Titles). Block 410 includes populating cells of the spreadsheet with the display values, as discussed more fully below.

FIG. 5 illustrates example payload employee data 500 retrieved from a web service (e.g., the web service 104 of FIG. 1) according to some implementations. Shown is a set of employee data 500, which is in a JavaScript Object Notation (JSON) format. As shown, some of the data 500 is not necessarily in a human readable format. In other words, a user would not be able to intuitively understand what some of the data means. For example, "DepartmentID" in one example has a value of "90." The user might not understand what "90" means.

FIG. 6 illustrates example payload job data 600 retrieved from a web service (e.g., the web service 104 of FIG. 1), according to some implementations. Shown is a set of job data 600, which is in JSON format.

At block 406 of FIG. 4, the client device 102 of FIG. 1 parses the payload job data 600 from the web service responses.

At block 408 of FIG. 4, the client device 102 of FIG. 1 converts identity values from the payload job data 600 into a predetermined format representing display values. In various implementations, the predetermined format is a form that is acceptable to the spreadsheet 112 of FIG. 1, in that the client device 102 converts values of the data 600 from web service encoding to/from spreadsheet encoding.

At block 410 of FIG. 4, the client device 102 of FIG. 1 populates the spreadsheet UI display screen 112 of FIG. 3 with converted values representing display values, which may involve heavy lifting with a spreadsheet application programming interface (API).

FIG. 7 illustrates example fields of a spreadsheet UI display screen section 700 with display values (that have been converted or translated from associated identity values), according to some implementations. As shown in FIG. 7, the HireDate JSON string values (e.g., 2003 Jun. 2017, etc.) of FIG. 5 are converted into spreadsheet date values (e.g., Jun. 17, 2003, etc.) displayed in FIG. 7. Also, the JobID JSON string values (e.g., AD_PRES, etc.) of FIG. 6 are converted into spreadsheet text values (e.g., President, Accountant etc.) displayed in FIG. 7. The Salary JSON number value (e.g., 24000, etc.) of FIG. 5 is converted into a spreadsheet number (double) value (e.g., 24,000.00, etc.) and displayed in FIG. 7. Similarly, the DepartmentID JSON string values (e.g., 90, etc.) of FIG. 5 are converted into spreadsheet text values (e.g., Executive, Finance, etc.) and displayed in FIG. 7.

Figure 8:
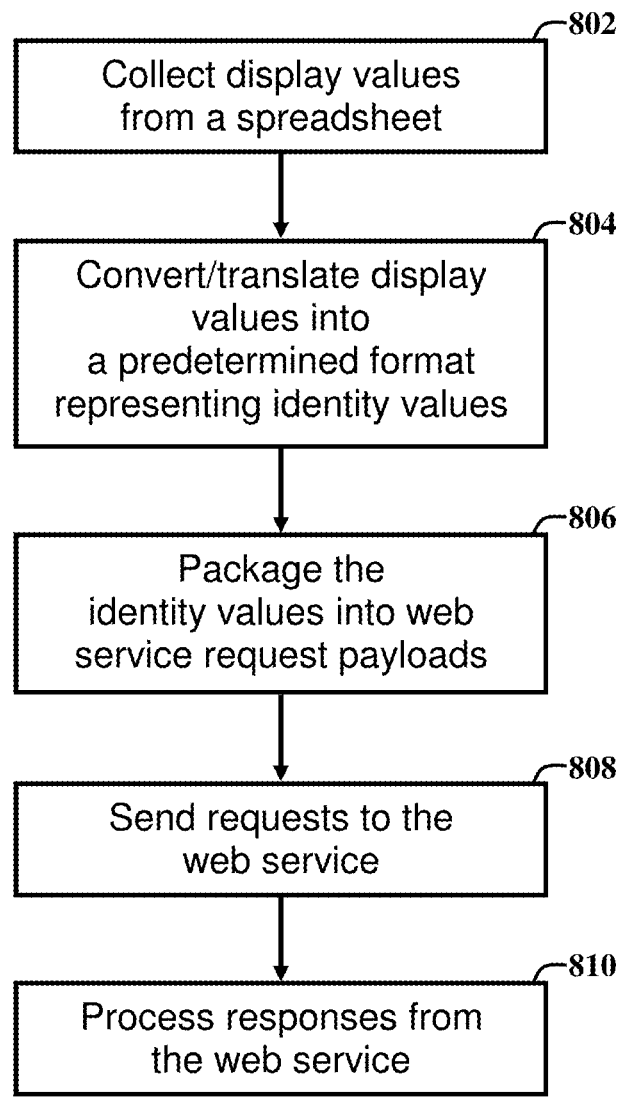
FIG. 8 illustrates a third example flow diagram for uploading data from a spreadsheet, according to some implementations.

FIG. 8 illustrates a third example flow diagram for uploading data from a spreadsheet (e.g., the spreadsheet 112 of FIG. 1 and accompanying UI display screen of FIG. 3), according to some implementations. As described in more detail herein, the flow of FIG. 8 generally describes operations of a runtime phase, where the client device 102 of FIG. 1 accesses data presented in the spreadsheet 112, converts the data (e.g., in accordance with user specified manipulations), and sends the converted data to the web service 104. This flow diagram may correspond to and provide example details for block 214 of FIG. 2, where the system sends (payload) data changes to the web service 104.

At block 802 of FIG. 8, a system, such as client device 102 of FIG. 1, collects display values from a spreadsheet, e.g., the spreadsheet 112 of FIG. 1. In various implementations, the client device 102 of FIG. 1 may provide an upload-changes button (e.g., upload-changes button 306 of FIG. 3) for uploading the data changes from the spreadsheet 112 of FIG. 1 to the web service 104.

In various implementations, after a user makes changes to data in the spreadsheet, the user may select (e.g., click) upload changes button 306, which causes the client device 102 to send the data changes from the spreadsheet 112 of FIG. 1 to the web service 104, where the spreadsheet 112 is bound to the web service 104. In various implementations, the client device 102 of FIG. 1 converts the data from spreadsheet encoding to web service encoding as well as translates display values to identity values during upload operations.

FIG. 9 illustrates example fields of a spreadsheet UI display screen section 900 with changed identity values, according to some implementations. As shown in this example implementation, the user has modify cell values for an employee (e.g., Daniel Faviet), where a format of the Hire Date is changed to "Sep. 5, 2005," (relative to the corresponding entry of 2005 Sep. 1 in FIG. 5); the Job Title is changed to Accounting Manager, and the Salary is changed to "10,000.53." For ease of illustration, not all fields are shown. Also shown is an update indicator 902, which indicates to the user that one or more of the fields in the spreadsheet have been updated.

At block 804 of FIG. 8, the client device 102 of FIG. 1 converts display values from the spreadsheet data to a predetermined format (e.g., representing or characterizing identity values) in preparation for sending to the web service 104 of FIG. 1. In various implementations, the predetermined format is a format that is acceptable to a particular web service. The particular format may vary, and will depend on the particular implementation.

At block 806, the client device 102 of FIG. 1 packages the identity values (that are formatted in accordance with the predetermined format required by the associated web service that is to be called in block 808) into web service request payloads. In block 808, the client device 102 sends requests to the web service (e.g., the web service(s) 104 of FIGS. 1 and 16), where the requests include the web service request payloads. The web service 104 then returns associated responses to the client device 102, which are then processed thereby in block 810, as discussed more fully below.

FIG. 10 illustrates an example package of converted display values 1000 in JSON format, according to some implementations. As shown in FIG. 10, the Hire Date spreadsheet date value (e.g., Sep. 5, 2005) of FIG. 9 is converted into JSON string values (e.g., 2005 Sep. 5) in FIG. 10. Also, the Job Title (corresponding to Job ID) text values (e.g., Accounting Manager) of FIG. 9 are converted to JSON string values (e.g., AC_MGR) in FIG. 10. The Salary number value (e.g., 10,000.53) of FIG. 9 is converted into a JSON number value (e.g., 10000.53) in FIG. 10.

At block 808, the client device 102 of FIG. 1 sends requests to the web service 104 of FIG. 1, where the requests include the web service request payloads. In various implementations, by sending the data changes from the spreadsheet 112 of FIG. 1 to the web service 104, the client device 102 causes the web service 104 to then provide the data changes in the spreadsheet 112 to a business application. Consequently, the client device 102 automatically integrates the spreadsheet 112 with the web service 104 of FIG. 1. In various implementations, the spreadsheet 112 of FIG. 1 is an integrated spreadsheet that is integrated with (or bound to) the web service 104, where spreadsheet 112 has a unique table component that maps attributes, fields, and associated properties with columns and cells of the spreadsheet 112.

At block 810 of FIG. 8, the client device 102 of FIG. 1 processes responses from the web service 104 of FIG. 1. If successful, a response (from the web service 104) associated with one or more changes indicates (to the client device 102) that the changes were applied successfully via a web service request.

FIG. 11 illustrates example fields 1100 of the spreadsheet of FIG. 9 with changed display values and an update succeeded indicator 1102, according to some implementations. The fields are the same in FIG. 11 as in FIG. 9 except that the update indicator in the change field of FIG. 9 is omitted in FIG. 11, and the status field in FIG. 9 populated with an update succeeded indicator 1102 in FIG. 11. If the update is not successful at the web service 104 of FIG. 1, the client device 102 may indicate this in the status field (e.g., "update failed").

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Figure 12:
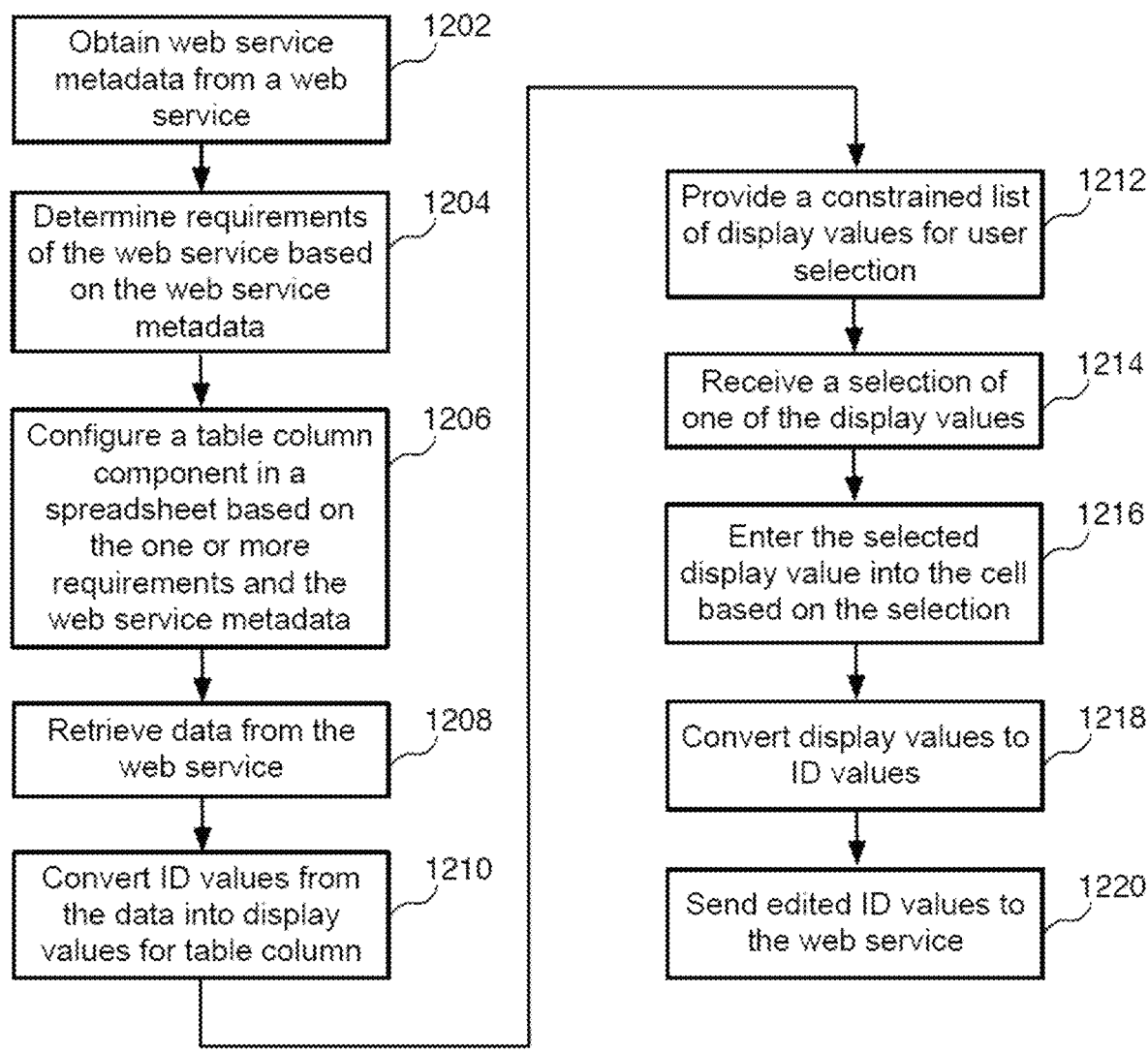
FIG. 12 illustrates a fourth example flow diagram for providing a constrained list of display values in a spreadsheet, according to some implementations.

FIG. 12 illustrates a fourth example flow diagram for providing a constrained list of display values in a spreadsheet, according to some implementations. As described in more detail herein, implementations provide a business user with a limited set of values for a user to select when entering values into cells of a spreadsheet.

Referring to both FIGS. 1 and 12, at block 1202, a system such as the client device 102 obtains the web service metadata 108 from the web service 104. As indicated herein, in some implementations, the client device 102 may contact the web service 104 via a URL (e.g., entered by a user in an API URL, etc.), and interrogate the web service 104 to obtain the web service metadata 108. As indicated herein, in some implementations, the web service 104 may be a REpresentational State Transfer (REST) service.

At block 1204 of FIG. 12, the client device 102 of FIG. 1 determines one or more requirements of the web service 104 based on the web service metadata 108. In various implementations, the client device 102 analyzes the web service metadata 108 to determine these requirements. Requirements may include, for example, a constrained list of display values that are allowed for one or more attributes that the web service 104 can provide.

As indicated herein, in various implementations, attributes or fields may be associated with an employee. Example attributes or fields may include employee ID, first name, last name, email, phone number, hire date, job title, salary, commission percentage, manager, department, etc. As indicated herein, the terms attribute and field may be used interchangeably. In various implementations, attributes may have particular properties that govern the behavior of the attributes. For example, properties may include whether an attribute is required or optional, what data types are required for an attribute, etc.

In various implementations, the corresponding field names and displayed header labels for these attributes or fields may differ. For example, the corresponding field names or business object field names may be: EmployeeId, FirstName, LastName, Email, PhoneNumber, HireDate, JobId, Salary, CommissionPct, ManagerId, DepartmentId, etc. The corresponding header labels may be: Id*, First Name, Last Name*, Email*, Phone#, Hire Date*, Job Title*, Salary, Commission %, Manager Id, Department, etc., as shown in FIG. 5. Accordingly, the header label (e.g., labels of the headers 302 of FIG. 3) may be more easily readable to a user than the actual field name.

In various implementations, metadata 108 describes how attributes are mapped to constrained lists of values. For attributes mapped to a constrained list of display values, some implementations may covert (translate/map) a code or ID data value to a more meaningful (to the end-user) display value, as will be described in more detail below.

Figure 13:
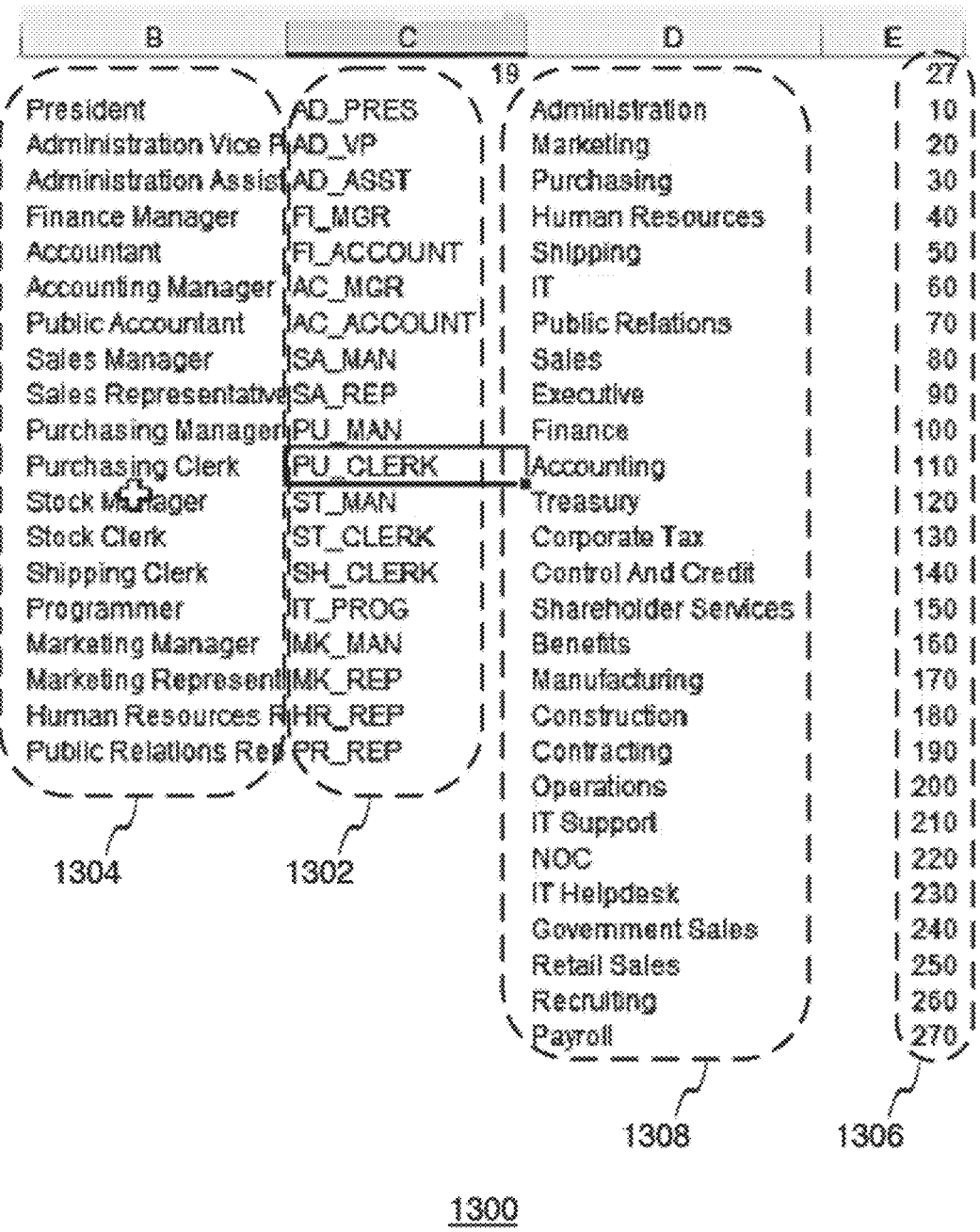
FIG. 13 illustrates two examples of constrained lists of display and ID values, according to some implementations.

FIG. 13 illustrates two examples of constrained lists of display and ID values in a portion of a spreadsheet 1300, according to some implementations. Shown is a list of data values 1302 that correspond to the job code (also called Job ID herein) attribute. As shown, there is a particular number of job codes, i.e., the list of data values 1302 is a constrained list. Also, the job codes in this list of data values 1302 are in a particular text format or code (e.g., AD_PRES, AD_VP, AD_ASST, etc.). The limited number of job codes and the particular format are requirements indicated in the metadata, e.g., the web service metadata 108 of FIG. 1.

Also shown is a list of (job title) values 1304 (e.g., President, Administration Vice President, Administration Assistant, etc.), where the items in the list of job title values 1304 correspond to the items in the list of (job code) data values 1302. For example, President corresponds to AD_PRES, Administration Vice President corresponds to AD_VP, Administration Assistant corresponds to AD_ASST, and so on. The display values 1304 are easier for a user to read than the corresponding data values 1302, and are displayed in a spreadsheet in a UI display screen (e.g., as exemplified by FIG. 3) for the user to read.

In another example, additional data values 1306 that correspond to the department ID attribute (e.g., corresponding to the "DepartmentId" listed in FIG. 5) are also shown in FIG. 13. Also shown is a corresponding adjacent list of (department name) display values 1308, where the data values 1306 and adjacent display values 1308 correspond. For example, as shown, Administration corresponds with 10, Marketing corresponds with 20, Purchasing corresponds with 30, and so on. In some implementations, these mappings of display values to data or ID values may be stored in a worksheet, which may or may not be hidden from the user.

These lists 1302-1308 represent lists of values. As described in more detail herein, the client device 102 of FIG. 1 provides a constrained list of display values to a user. In some implementations, the data values may come from one source via the web service 104 of FIG. 1 and the display values may come from a different source via the web service 104, such that the web service 104 may front multiple data sources. In some implementations, when data is retrieved from the web service 104, the client device 102 translates the data (code) values into the corresponding display values for the end-user to see and select. Likewise, when sending data changes back to the web service 104, the client device 102 translates the chosen display values to data values for consumption by the web service 104.

As described in more detail herein, various implementations leverage such requirements in the metadata to automatically provide a user, such as a business user, with a list of selectable values to be entered in particular cells of a spreadsheet. This capability is provided to the business user with no need for programming.

At block 1206 of FIG. 12, the client device 102 of FIG. 1 configures the table column component 120 in the spreadsheet 112 based on the one or more requirements of the web service 104, which are specified via the web service metadata 108 of FIG. 1. The client device 102 automatically configures the table column components 120 in an editable table component in the spreadsheet 112 based on the metadata.

In various implementations, the table column component 120 of FIG. 1 retrieves the list of valid data values and corresponding display values from the web service 104 of FIG. 1 for constrained-list table columns, i.e., table columns whose attribute values are constrained to a list of allowable data values. The client device 102 of FIG. 1 determines the relationships between attributes and maps the attributes to table columns (derived from the constrained lists of attributes), and constrains the display values for those attributes in accordance with the constrained lists.

For example, the client device 102 of FIG. 1 may configure the table column component 120 to map attributes, such as job code and department ID, to particular columns in the spreadsheet. Also, the client device 102 may also configure the table column component 120 of FIG. 1 to map the constrained list of display values and corresponding display values of job titles to the job code attribute (also called the job ID attribute). Similarly, the client device 102 of FIG. 1 may configure the table column component 120 to map the constrained list of data values to the corresponding display values of department names to the department ID attribute.

At block 1208 of FIG. 12, the client device 102 of FIG. 1 retrieves data from the web service 104.

At block 1210 of FIG. 12, the client device 102 of FIG. 1 converts (translates/maps) ID values from the data into display values for a table column.

Figure 14:
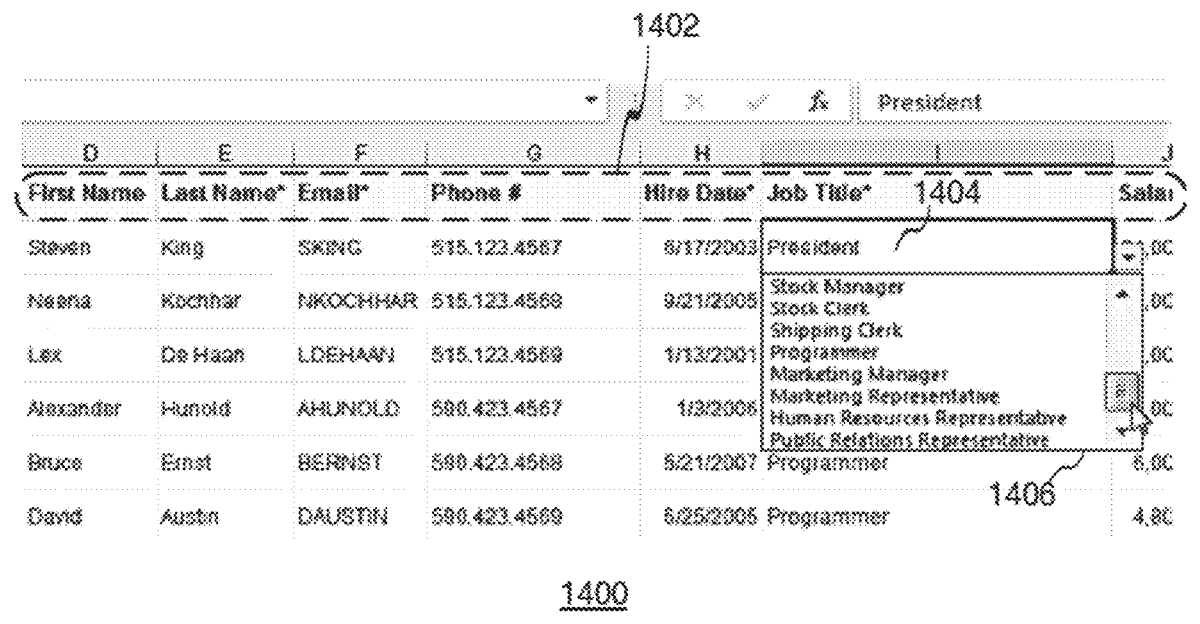

FIG. 14 illustrates example portion of a spreadsheet UI display screen 1400, according to some implementations. Shown are header labels 1402, including First Name, Last Name*, Email*, Phone#, Hire Date*, Job Title*, and so on. The particular example discussed below focuses on the job code attribute, which identifies a job ID, which in turn identifies a job title. Referring to the corresponding column with the header Job Title* in FIG. 14, the user can enter job titles for each employee in the cells of the spreadsheet UI display screen 1400. When the user selects or clicks on a particular cell 1404, the client device 102 of FIG. 1 detects the selection.

At block 1212 of FIG. 12, the client device 102 of FIG. 1 provides a constrained list of display values for user selection, in response to the user selecting a particular cell such as cell 1404 of FIG. 14. In some implementations, the constrained list of display values may be presented or rendered in a drop-down menu such as drop-down menu 1406, where the user can select a value from the list in the drop-down menu 1406.

While some example implementations are described in the context of drop-down menus, the particular presentation of the list of display values may vary depending on the particular implementation. For example, in some implementations, the client device 102 of FIG. 1 may display a popup dialog that allows the user to search for items in the constrained list and to select items from a list of search results. In another example implementation, the client device 102 of FIG. 1 may utilize attributes constrained to a list of display values, where the size of the list is quite large (which can make a drop-down menu UI control ill-suited for accommodating available selections). In some implementations, the client device 102 of FIG. 1 may allow for manual entry of display values for making edits, where the translation to data (code) values is still operative during upload (and vice/versa during download).

As indicted herein, in various implementations, the table column component 120 of FIG. 1 automatically constrains the list of display values that are displayed and that may be selected from the cells of the spreadsheet 112. In other words, columns of tabular data may have a constrained list of allowable values. When editing these columns, the user is only permitted to choose from that constrained list of display values. In this particular example shown, the user has selected the job title of President from the constrained list of display values (e.g., from drop-down menu 1406).

Figure 15:
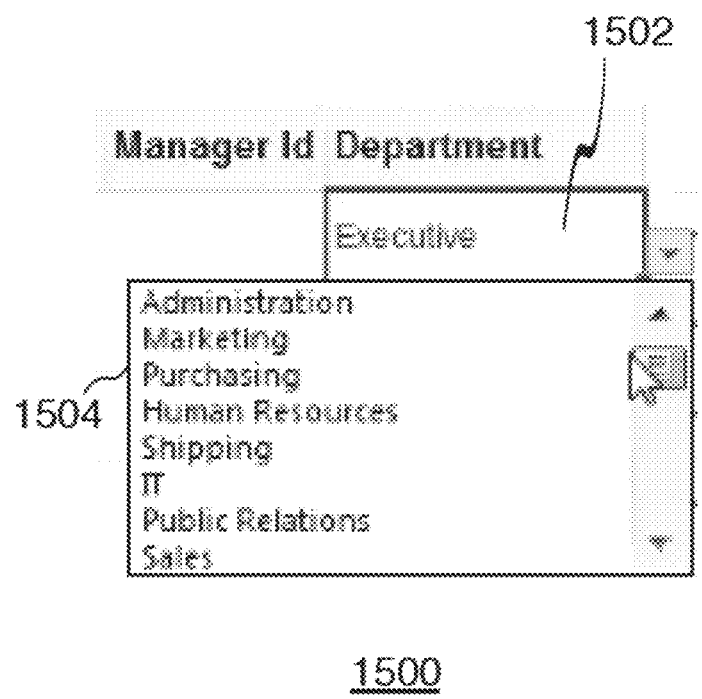
FIG. 15 illustrates example portion of a spreadsheet, according to some implementations.

FIG. 15 illustrates example portion of a spreadsheet UI display screen 1500, according to some implementations. Shown are header labels Manager Id and Department. The particular example discussed below focuses on the department attribute. Referring to the corresponding column with the header Department, the user can enter department names for each employee in the cells of the spreadsheet. In response to the user selecting cell 1502, the client device 102 of FIG. 1 provides a constrained list of (department name) display values in a drop-down menu 1504. In this particular example, the user selected Executive for the department name. While some example implementations are described herein in the context of a single cell associated with a single column, these implementations may also apply to multiple cells and multiple columns, depending on the particular implementation.

As shown, the constrained list of the drop-down menu 1504 as shown in FIG. 15 represents a list of display values, as opposed to a list of data values, as the list of display values are easier for the user to read. Providing the list of display values and enabling the user to select from among available display values (i.e., from a constrained list thereof) may reduce or eliminate the risk of user error.

At block 1214 of FIG. 12, the client device 102 of FIG. 1 receives a selection of one of the display values from the associated constrained list of display values. In the example of FIG. 14, the user selected President from the constrained list of (department name) display values. In the example of FIG. 15, the user selected Executive from the constrained list of (department) display values.

At block 1216 of FIG. 12, the client device 102 of FIG. 1 enters the selected display value into the cell based on the selection made by the user. In the example of FIG. 14, because the user selected President, the client device 102 of FIG. 1 enters President in cell 1404. In the example of FIG. 15, the user selected Executive; the client device 102 of FIG. 1 enters Executive in cell 1502.

In these examples, the values from the list of constrained values may be referred to as display values, in that the values are displayed in the spreadsheet 112 of FIG. 1 (and accompanying UI display screens) for user selection. The display values that are entered into cells of the spreadsheet are constrained to a list of allowable values.

At block 1218 of FIG. 12, the client device 102 of FIG. 1 converts display values to ID values.

At block 1220, the client device 102 of FIG. 1 sends edited ID values to the web service 104 of FIG. 1. In some implementations, the client device 102 of FIG. 1 sends the data value that corresponds to the display value back to the web service 104. In various implementations, table column component 120 of FIG. 1 maps a selected display value to a corresponding data value, and then sends the data value back to the web service 104. For example, if the user selects (job title) President, the client device 102 of FIG. 1 sends the associated data (job code, i.e., job ID) data value AD_PRES (e.g., as shown in FIG. 5) to the web service 104. In another example, if the user selects (department name) Executive, the client device 102 of FIG. 1 sends the (department) data value 90 (e.g., as shown in FIGS. 5 and 13) to the web service 104 of FIG. 1.

In some implementations, two or more selected displayed values may be mapped to a single data value, where the single data value is sent or posted to the web service 104. By limiting the possible data entries for the user and assisting the user in entering values in the appropriate cells, and sending the correct corresponding data values to the web service 104, the client device 102 of FIG. 1 reduces the risk of data entry errors.

Implementations described herein enable business users with no previous programming experience to rapidly integrate spreadsheets with web applications in order to retrieve, analyze, and edit data for table columns constrained to a specific list of choices. It allows the business users to create and use ad-hoc graphical user interfaces (GUIs) in a spreadsheet without any dependency on web application development teams to create the GUI. Implementations enable a GUI to constrain certain columns to show and allow choices from a constrained list of display values. This reduces data entry errors by presenting the user with only the list of allowable choices for that column's cells.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Implementations described herein provide various benefits. For example, implementations enable users with no previous programming experience to rapidly integrate spreadsheets with web applications in order to retrieve, analyze, and edit data. Implementations also enable users to create and use ad-hoc graphical user interfaces (GUIs) in a spreadsheet without any dependency on web application development teams to create the GUI. Furthermore, implementations provide a business user with selectable values for particular cells of a spreadsheet. Implementations also reduce the net cost of such data entry tasks. Implementations also enable users with no previous programming experience to rapidly integrate spreadsheets with web applications in order to retrieve, analyze, and edit data. Implementations also enable users to create and use ad-hoc graphical user interfaces (GUIs) in a spreadsheet without any dependency on web application development teams to create the GUI.

FIG. 16 illustrates a second block diagram showing an example system 10 and accompanying computing environment employing a client-side add-in 14 to augment the spreadsheet 112 with functionality for facilitating efficient user selections for spreadsheet cells, where selections may be made from bounded and/or unbounded lists based, in part, on communications with a server system 16.

The client device 102 runs the client-side program (e.g., spreadsheet) 112 and accompanying add-in 14. The add-in 14 augments the spreadsheet 112 with functionality for not just selectively retrieving data from backend server-side database 26 via one or more web services or APIs 104 running on the server system 16, but further includes modules 18-24 for facilitating creating an enhanced data-selection dialog (e.g., the dialog 36 of FIG. 17) and efficiently populating the dialog with data, as discussed more fully below.

The example spreadsheet add-in 14 includes an intelligent cache 18 for selectively caching data retrieved for use by a specialized data-selection dialog generated by an enhanced data-selection dialog creator 24. A cache updater 20 includes code for selectively caching data (in the intelligent cache 18) retrieved by the backend database 26 for use in the data-selection dialog created by the enhanced data-selection dialog creator 24.

A data virtualizer 22 communicates with the web services 104 to retrieve data from the backend database 26 in accordance with web-service and/or API metadata used to determine how to retrieve the data. The data virtualizer 22 may retrieve data on demand (e.g., as needed as the user scrolls in a data-selection dialog) from the backend database 26 via the web services and/or API(s) 104. The metadata used by the data virtualizer 22 to retrieve data from the backend database describes data, e.g., computing objects and relationships between data elements of the computing objects (to be retrieved from the backend database 26), that are applicable to a particular spreadsheet cell entry. The descriptions of the data and the web services and/or APIs 104 (where the descriptions are obtained via, or otherwise represent, the metadata) are then used to configure the display of data in the data-selection dialog created by the enhanced data-selection dialog creator 24.

Accordingly, data displayed in the enhanced data-selection dialog is said to be "virtualized data." For the purposes of the present discussion, virtualized data may be any data that is selected from or derived from a larger set of data, and where the data provides a selective view applicable to the larger set of data or subset thereof.

For example, the enhanced data-selection dialog creator 24 may use the data virtualizer 22 to determine that a particular cell should be associated with a data-selection dialog that includes a particular choice list that includes first name, last name, etc., for each choice. This determination may be made, in part, via self-describing properties of the web services and/or APIs 104, which may be polled by the data virtualizer 22 for information (i.e., metadata) that relates to a particular spreadsheet cell contents. That data virtualizer 22 may also extract metadata from the client-side program 112 to facilitate constructing request messages to the web services or APIs to obtain applicable metadata for a particular spreadsheet cell.

As another example, the data virtualizer 22 may determine that a manager attribute associated with a particular cell is related to a list of employees, each associated with one of a hundred departments. The data virtualizer 22 may then ask (e.g., via one or more request messages) the web services or APIs 104 what relationships the manager attribute has with other data or computing objects. The metadata obtained by the data virtualizer 22 (e.g., to determine how to obtain data from the backend database 26) may then be used by the enhanced data-selection dialog creator 24 to automatically configure the associated data-selection dialog to include a choice list with several columns for a particular manager, such as associated employees, departments, and so on. The resulting data-selection dialog may further allow searching on an employee attribute, department ID, or other related attribute, when making data-entry selections for the particular spreadsheet cell, as discussed more fully below.

Note that selective communications with the web services 104, so as retrieve data as needed (to provide data-selection entry options for a particular spreadsheet cell) from the backend database 26, enables the spreadsheet add-in 14 to support unbounded lists of selectable items in an associated data-selection dialog. An initially displayed data-selection dialog may be populated with any preexisting cached data for that particular spreadsheet cell.

During scrolling in the dialog, additional requests (e.g., as may be made by the data virtualizer 22 and/or cache updater 20) for data may be made to the backend database 26 via the web services or APIs 106. The intelligent cache 18 may then be updated with the additionally retrieved data in response to a signal from the cache updater 20.

Figure 17:
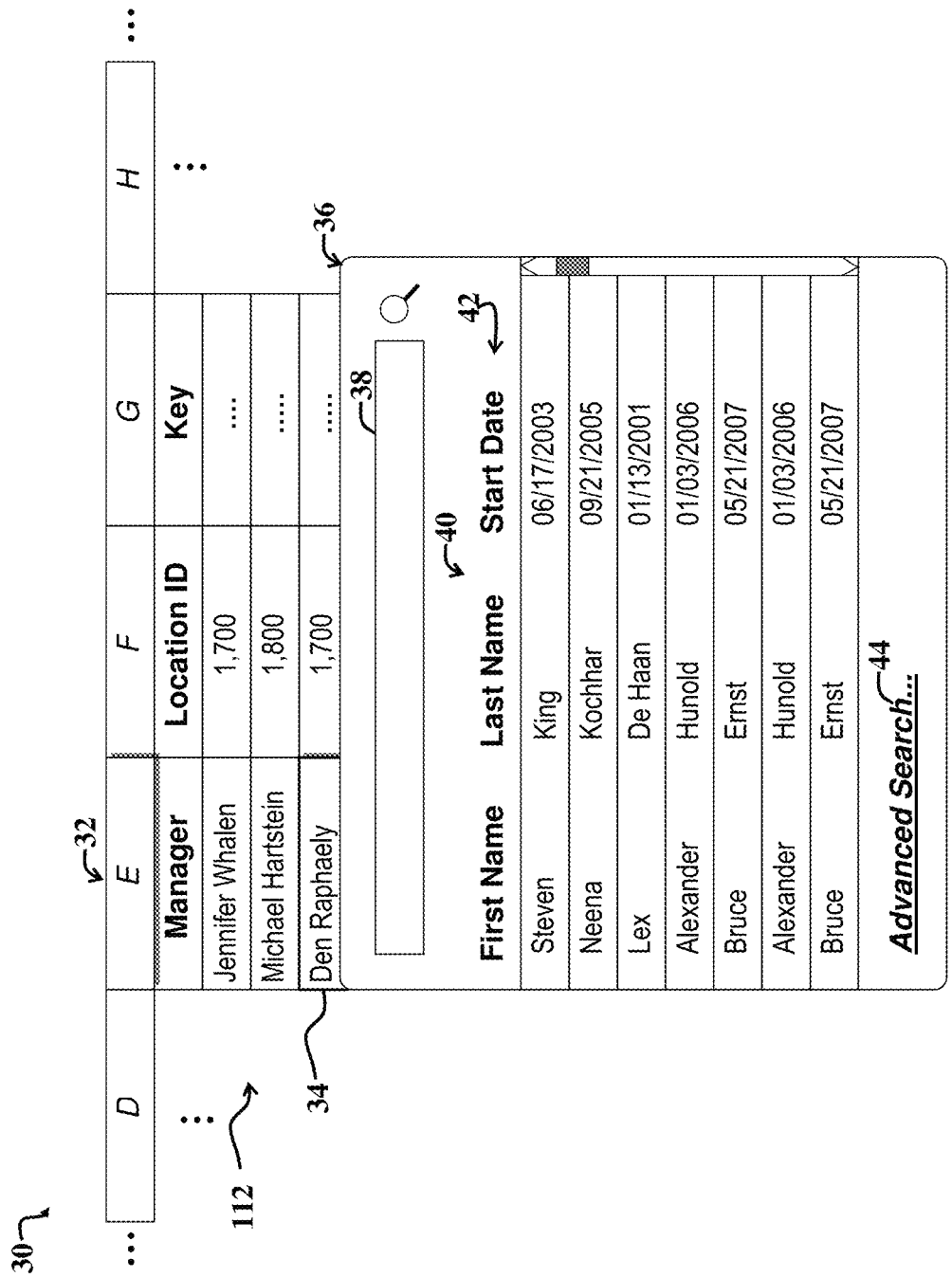
FIG. 17 illustrates a first UI display screen showing a spreadsheet and a first enhanced data-selection dialog (which may be implemented as an enhanced drop-down menu, pop-up menu, etc.) for facilitating efficient user selections from among bounded and/or unbounded lists of values for table cell entries.

FIG. 17 illustrates a first UI display screen 30 showing a spreadsheet 112 and a first enhanced data-selection dialog (which may be implemented as an enhanced drop-down menu, pop-up menu, etc.) for facilitating efficient user selections from among bounded and/or unbounded lists of values for table cell entries.

In the present example embodiment, a user has selected a table cell 34 (Den Raphaely) from a manager column 32 of the spreadsheet 112. User selection of the cell 34 causes display of the enhanced data-selection dialog 36 (also simply called data-selection dialog herein). Note that while, in the present example embodiment, display of the enhanced data-selection dialog 36 is triggered or activated via user selection of the cell 34, that embodiments are not limited thereto. For example, in certain implementations, the enhanced data-selection dialog 36 may be activated via a drop-down UI control; via an option provided by a right-click menu, hover layer, or other mechanism, such as double clicking on a cell.

For the purposes of the present discussion, an enhanced data-selection dialog may be any UI display screen, window, or component thereof that provides user options and associated controls for searching and/or sorting lists of selectable items (e.g., computing objects corresponding to rows of a table) for entry into a cell or field of an underlying UI display screen, such as a spreadsheet or form. Accordingly, an enhanced data-selection dialog may also represent an enhanced data-entry dialog, to the extent that data is selected from the enhanced data-selection dialog for the purposes of data entry in to a particular field or cell of an underlying UI display screen.

In the present example embodiment, the enhanced data-selection dialog 36 is a modeless dialog, such that the dialog 36 is presented on top of the underlying spreadsheet 112 UI display screen while also allowing user interaction with (e.g., selection of other cells) the underlying spreadsheet 112 UI display screen. For instance, while the cell 34 has been selected in the UI display screen 30 of the spreadsheet 112 (thereby triggering display of the enhanced data-selection dialog 36), another cell of the spreadsheet 112 may be selected (while the enhanced data-selection dialog 36 is displayed), thereby causing the enhanced-search dialog 36 to be replaced by another enhanced data-selection dialog applicable to the newly selected cell.

The example enhanced data-selection dialog 36 includes a search field 38, whereby a user may enter a search term so as to trigger a search from among a list of values 40, also called a listing of selectable items herein. Note that the selectable items in the listing 40 (also called a table herein) may include strings (e.g., names, sentences, etc.), dates, etc., as well as corresponding computing objects. In the present example embodiment, the listing of selectable items 40 is presented as a table, where each row of the table represents or is associated with a computing object. Attributes of the computing objects are displayed by column identified by column headers 42, such as first name, last name, start date, etc.

In the present example embodiment, each of the column headers 42 acts as a selectable UI control, such that user selection of one of the headers 42 results in sorting of the listing 40 based on the selected header. For example, user selection of the "First Name" column header will result in sorting of the listing 40 alphabetically by first name. Similarly, user selection of the "Start Date" column header results in sorting of the listing 40 by date.

The enhanced data-selection dialog 36 further includes an advanced-search UI control 44. User selection of the advanced-search UI control 44 results in updating of the enhanced data-selection dialog with additional UI controls for specifying more detailed search criteria, as discussed more fully below with reference to FIG. 19. Note that upon user selection of the advanced-search UI control 44, the enhanced data-selection dialog seamlessly transitions to include additional search controls. This obviates the need for the user to remove focus from the enhanced data-selection dialog 36 when choosing to access additional functionality applicable to making user selections from among the listing 40.

Figure 18:
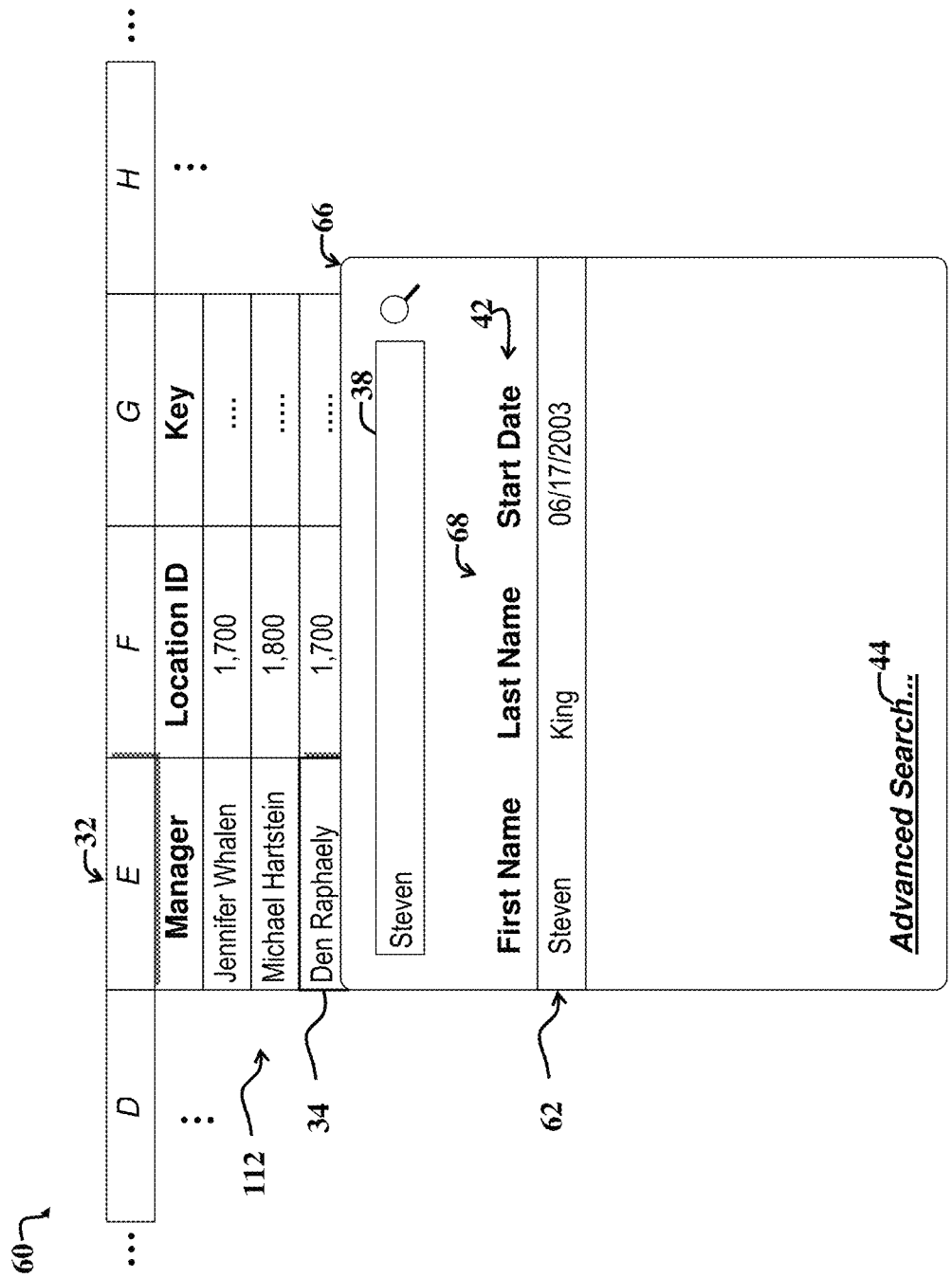
FIG. 18 illustrates a first updated version of the first UI display screen of FIG. 17, where the first enhanced data-selection dialog of FIG. 17 has been updated after a user has entered a search term therein, resulting in a first updated data-selection dialog.

FIG. 18 illustrates a first updated version 60 of the first UI display screen 30 of FIG. 17, where the first enhanced data-selection dialog 36 of FIG. 17 has been updated after a user has entered a search term therein, resulting in a first updated data-selection dialog 66.

The example updated data-selection dialog 66 represents a version of the enhanced data-selection dialog 36 of FIG. 17 after a user has entered a search term (i.e., "Steven") in the search field 38. This results in an updated listing 68 search-result item(s) 62 that match the entered search term. Searching functionality discussed herein can be particularly useful for facilitating accurate and efficient user selections from among large listings of selectable items, such as by obviating the need to scroll through excessively long lists.

FIG. 19 illustrates a second updated version of the first UI display screen 30 of FIG. 17, where the first enhanced data-selection menu 36 of FIG. 17 has been updated after a user has selected an advanced-search option 44 therein, resulting in a second updated data-selection dialog 76.

The second updated data-selection dialog 76 has been seamlessly augmented with additional advanced-search UI controls 82-88 in an advanced-search section 80 of the dialog 76. The advanced-search UI controls 82-88 provide user options to specify additional more complex search criteria (other than simple a keyword search criterion).

For example, a first UI control 82 represents a drop-down menu that provides a user option to specify an aspect of a search criterion (e.g., a comparison type or operator for searching on a last name). The UI control in 82 allows the user to select the comparison type (or operator), that together with text supplied in a "Starts With" field 84, represent a search criterion. In the data-selection dialog 76, the user has selected a "Starts With" option. A corresponding "Starts With" field 84 provides a space whereby a user may enter first portion (e.g., one or more letters) of a last name as part of a collection of search criteria provided by the advanced-search controls 82-88.

A second UI control 86 represents a drop-menu that provides a user option to specify a search criterion for searching on a range of start dates. The user has selected a "Before" option. A corresponding date field 88 provides a space whereby a user may enter date to limit the search to items associated with start dates before the date specified in the date field 88.

An additional "Add Field" UI control 90 provides a user option to trigger functionality for adding additional search controls and/or fields enabling a user to specify additional search criteria. A search button 92 triggers a search of a listing of selectable items 98 in accordance with the search criteria specified via the advanced-search controls 82-88 of the advanced-search section 80. An additional UI control 78 enables a user to collapse or show the UI controls 82-92 of the advanced-search section 80.

The second updated enhanced data-selection dialog 76 further includes an "Ok" button 100 and a "Cancel" button 102 for accepting any user selections or canceling a particular search, respectively.

Figure 20:
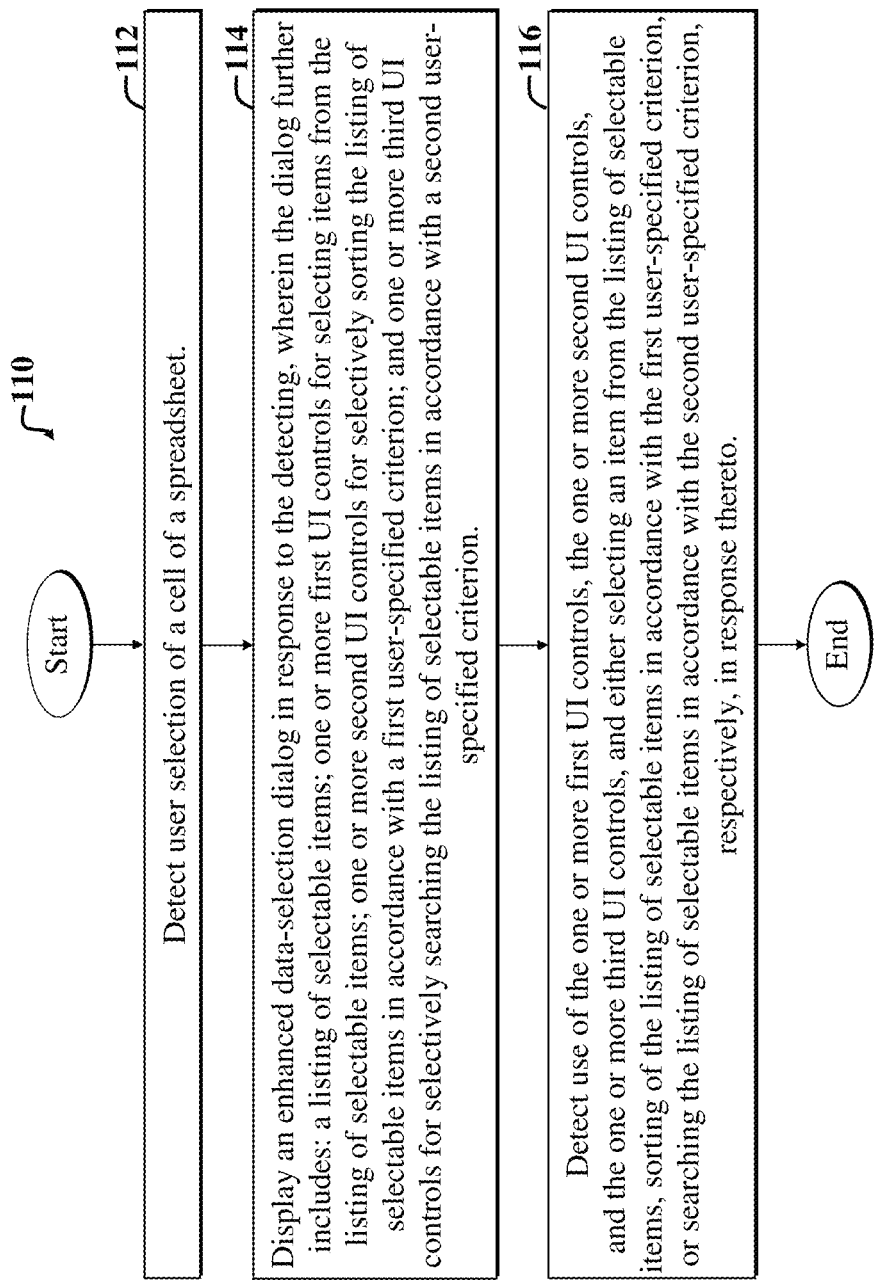
FIG. 20 illustrates a fifth example flow diagram of an example method that is adapted for use with the embodiments of FIGS. 16-20.

FIG. 20 illustrates a fifth example flow diagram of an example method 110 that is adapted for use with the embodiments of FIGS. 16-20. The example method 110 involves use of an enhanced data-selection dialog (e.g., corresponding to the dialog represented by the UI display screen portions 36, 66, 76 of FIGS. 17-19, respectively.

With reference to FIGS. 16-20, the example method 110 includes a first step 112, which involves detecting user selection of a cell of the spreadsheet, such as the spreadsheet 112 of FIG. 17-18.

A second step 114 includes displaying a data-selection dialog in response to the detecting. The data-selection dialog includes a listing of selectable items (e.g., the items 40 of FIG. 17); one or more first UI controls (where the one or more first UI controls may represent the displayed items themselves, e.g., table rows) for selecting items from the listing of selectable items; one or more second UI controls (where the one or more second UI controls may represent the selectable headers 42 of FIGS. 17-19) for selectively sorting the listing of selectable items in accordance with a first user-specified criterion (e.g., as identified by the name of a selected header); and one or more third UI controls (e.g., corresponding to the search field 38 of FIGS. 17, 18, and/or the advanced search UI controls 82-88 of FIG. 19) for selectively searching the listing of selectable items in accordance with a second user-specified criterion.

A third step 116 includes detecting use of the one or more first UI controls, the one or more second UI controls, and the one or more third UI controls, and either selecting an item from the listing of selectable items, sorting of the listing of selectable items in accordance with the first user-specified criterion, or searching the listing of selectable items in accordance with the second user-specified criterion, respectively, in response thereto.

Note that the example method 110 may be modified, without departing from the scope of the present teachings. For example, in certain embodiments, controls for providing sorting options may be omitted, or search options may be omitted, without departing from the scope of the present teachings.

The example method 100 may be further modified to specify, for instance, that the data-selection dialog includes or represents a modeless data-selection dialog, and wherein modeless data-selection dialog includes the listing of selectable items, and wherein the list of selectable items is arranged in rows of a table (e.g., the table 40 of FIG. 17).

The table may include one or more rows of selectable items and one or more columns of sub-items (e.g., manager name, start date, etc., for a manager item) for each selectable item. The listing of selectable items may be bounded or unbounded. In various embodiments discussed herein, unbounded lists may involve on-demand retrieval of server-side data. For the purposes of the present discussion, a listing is said to be unbounded or unconstrained if the number of items displayable in or accessible via the listing has no predetermined fixed limit as to the number of items that can be included in the listing. For instance, the selectable items of the listing may be only fixed by the amount of applicable available data from the associated server system used to populate data of the enhanced-search dialog.

The example method 110 may further specify that the first specified criterion specifies sorting of the selectable items by a header of the one or more columns. The header may include, for instance, a date header, enabling sorting of the selectable items by date. The header further includes, for instance, a name header, wherein a column of the data-selection dialog is identified by the name header, and wherein selection of a name header results in alphabetical sorting of the listing of selectable items by name.

The example method 110 may be further modified to include providing one or more fourth UI controls for triggering display of one or more advanced-search UI controls (e.g., the controls 82-88 of FIG. 19) in the drop-down UI display screen, thereby resulting in display of an advanced-search dialog (e.g., the dialog 76 of FIG. 19, which includes the advanced-search section 80).

The example method 110 may further specify that the advanced-search dialog further includes one or more fourth UI controls (e.g., the advanced-search UI controls 82-88 of FIG. 19) for providing user options to enter multiple search criteria. The advanced-search dialog may further include one or more fifth UI controls (e.g., the "Add Field" UI control 90 of FIG. 19) for enabling addition of one or more sixth UI controls enabling a user to specify additional search criteria, in addition to the multiple search criteria.

With reference to FIGS. 16 and 20, the example method 110 may be further modified to include determining items in the listing of selectable items by: accessing metadata (e.g., via the data virtualizer 22 of FIG. 16) pertaining to a web service (e.g., the web service or API 104 of FIG. 16) from which the spreadsheet is to obtain data for a selected field (e.g., the field 34 of FIGS. 17-18) of the spreadsheet; obtaining data for a particular cell of the spreadsheet in accordance with the metadata, resulting in obtained data; using the metadata to populate the data-selection dialog (e.g., via the enhanced data-selection dialog creator 24 of FIG. 16) with the listing of selectable items in accordance with the obtained data and associated metadata; and selectively caching (e.g., via the cache updater 20 and intelligent cache 18 of FIG. 16) the obtained data for future use.

The example method 110 may further include determining that a user has scrolled past retrieved data in the listing of selectable items, and then: selectively retrieving (e.g., via the data virtualizer 22 of FIG. 16) additional data from the web service in accordance with the metadata; and augmenting the listing of selectable items with the retrieved data.

Figure 21:
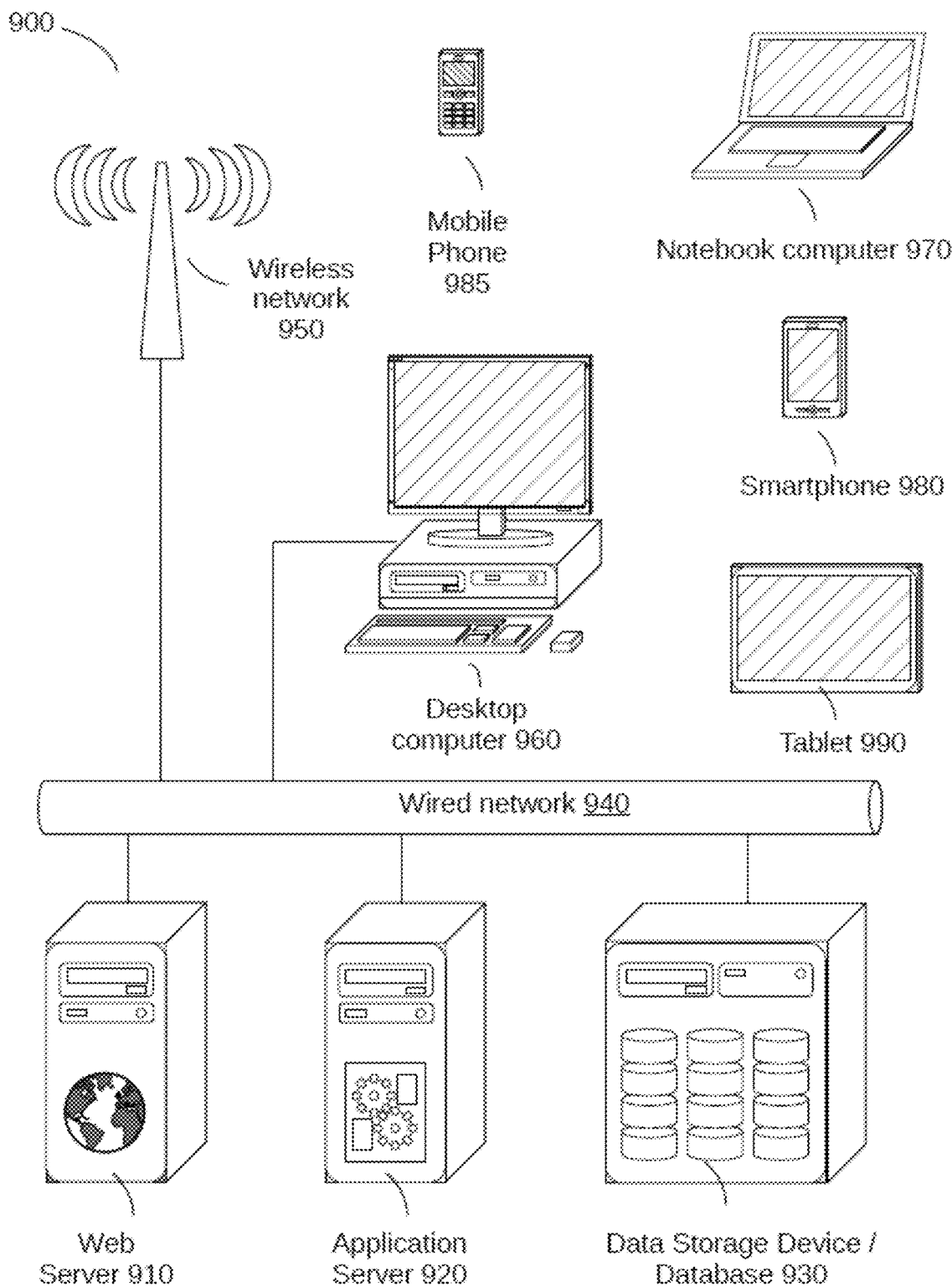
FIG. 21 illustrates a block diagram of an example system, which may be used for implementations described herein.

FIG. 21 illustrates a block diagram of an example system 1600, which may be used for implementations described herein. Example system 1600 is capable of supporting or running various hardware and/or software modules and associated methods discussed with reference to implementations described herein. Note that certain implementations may be implemented using one or more standalone applications (for example, residing in a user device) and/or one or more web-based applications implemented using a combination of client-side and server-side code. While system 1600 performs implementations described herein, in other implementations, any suitable component or combination of components associated with system 1600 or any suitable processor or processors associated with system 1600 may facilitate performing the implementations described herein. In various implementations, system 1600 may not have all of the components shown and/or may have other elements including other types of components instead of, or in addition to, those shown herein.

General system 1600 includes user devices 1660-1690, including one or more desktop computers 1660, one or more notebook computers 1670, one or more smart-phones 1680, one or more mobile phones 1685, and one or more tablets 1690. The general system 1600 can interface with any type of user device, such as a thin-client computer, Internet-enabled mobile telephone, mobile Internet access device, tablet, electronic book, or personal digital assistant, capable of displaying and navigating web pages or other types of electronic documents and UIs, and/or executing applications. Although the system 1600 is shown with five user devices, any number of user devices can be supported.

A web server 1610 is used to process requests from web browsers and standalone applications for web pages, electronic documents, enterprise data or other content, and other data from the user computers. The web server 1610 may also provide push data or syndicated content, such as RSS feeds, of data related to enterprise operations.

An application server 1620 operates one or more applications. The applications can be implemented as one or more scripts or programs written in any programming language, such as Java, C, C++, C#, or any scripting language, such as JavaScript or European computer manufacturers association script (ECMAScript), Perl, hypertext preprocessor (PHP), Python, Ruby, or tool command language (TCL). Applications can be built using libraries or application frameworks, such as Rails, Enterprise JavaBeans, or .NET. Web content may be created using hypertext markup language (HTML), cascading style sheets (CSS), and other web technology, including templating languages and parsers.

The data applications running on the application server 1620 are adapted to process input data and user computer requests and can store or retrieve data from the data storage device or database 1630. The database 1630 stores data created and used by the data applications. In some implementations, the database 1630 includes a relational database that is adapted to store, update, and retrieve data in response to SQL format commands or other database query languages. Other implementations may use unstructured data storage architectures and Not Only SQL (NoSQL) databases.

In some implementations, the application server 1620 includes one or more general-purpose computers capable of executing programs or scripts. In some implementations, the web server 1610 is implemented as an application running on the one or more general-purpose computers. The web server 1610 and application server 1620 may be combined and executed on the same computers.

An electronic communication network 1640-1650 enables communication between user computers 1660-1690, web server 1610, application server 1620, and database 1630. In some implementations, the networks 1640-1650 may further include any form of electrical or optical communication devices, including wired network 1640 and wireless network 1650. The networks 1640-1650 may also incorporate one or more local-area networks, such as an Ethernet network, wide-area networks, such as the Internet; cellular carrier data networks; and virtual networks, such as a virtual private network.

The system 1600 is one example for executing applications according to some implementations. In some implementations, the application server 1610, web server 1610, and optionally, the database 1630, can be combined into a single server computer application and system. In further implementations, virtualization and virtual machine applications may be used to implement one or more of the application server 1620, web server 1610, and database 1630.

In still further implementations, all or a portion of the web and application serving functions may be integrated into an application running on each of the user computers. For example, a JavaScript application on the user computer may be used to retrieve or analyze data and display portions of the applications.

In various implementations, the system 1600 may not have all of the components shown and/or may have other elements including other types of components instead of, or in addition to, those shown herein.

With reference to FIGS. 16 and 21, the client device(s) or system(s) 102 of FIG. 16 may be implemented via one or more of the desktop computer 960, tablet 990, smartphone 980, notebook computer 970, and/or mobile phone 985 of FIG. 21. The server system 16 of FIG. 16 may be implemented via the web server 910 and/or application server 920 of FIG. 21. The backend database 26 of FIG. 16 may be implemented via the data storage device or database 930 of FIG. 21.

In one example scenario, the web services or APIs 104 of FIG. 16 run on an application server (e.g., the application server 920 of FIG. 7), but are accessible (to users and client-side software) via webpage code of a website hosted by the web server 910 of FIG. 21. The web services or APIs 104 of FIG. 16 that run on the application server 920 of FIG. 21 may enable access to and use of data and functionality maintained via the data storage device 930 of FIG. 21. The data storage device 930 of FIG. 21 may store so-called cloud-based data and may include backend databases accessible via software running on the application server 920.

Figure 22:
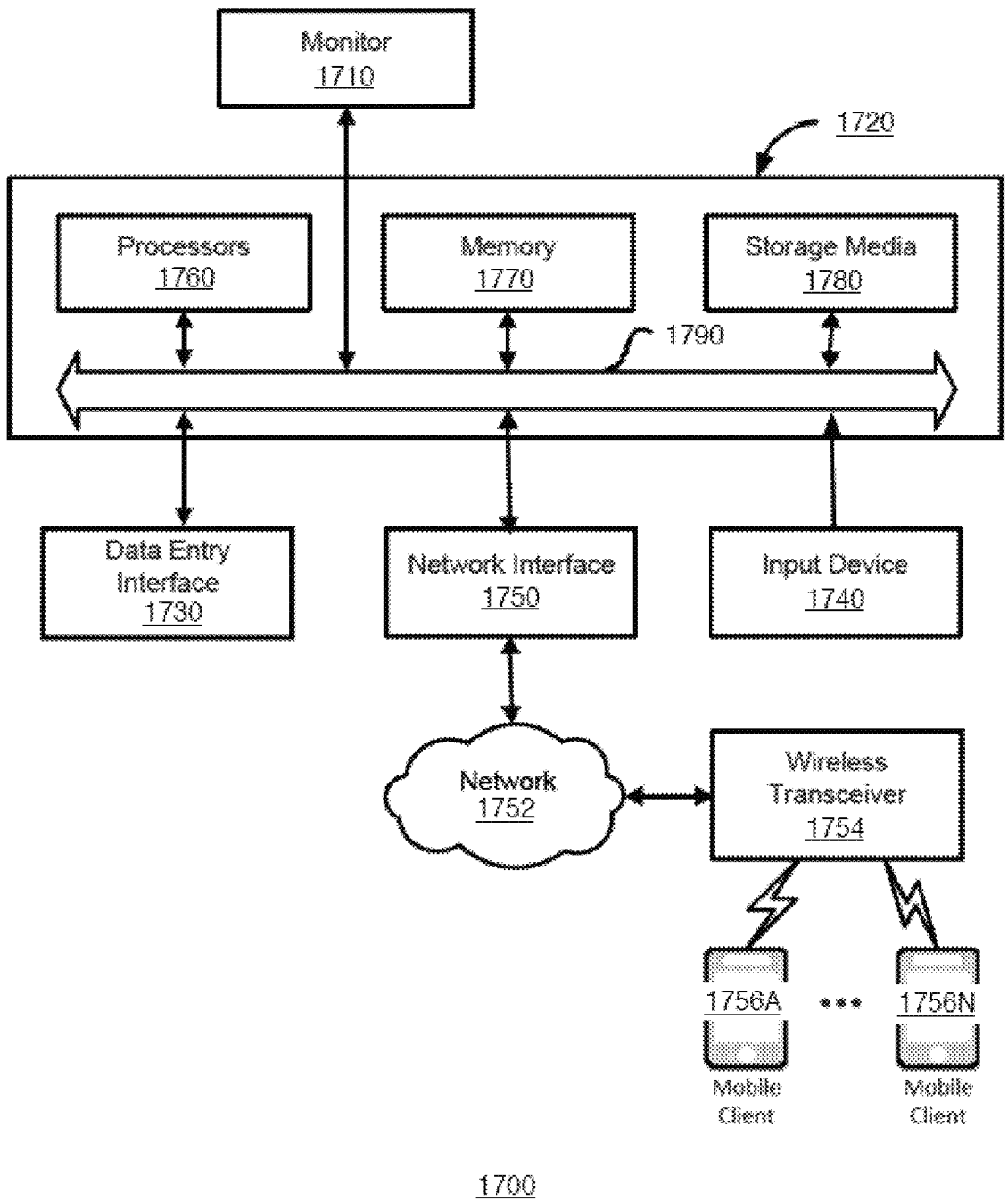
FIG. 22 illustrates a block diagram of an example network environment, which may be used for implementations described herein.

FIG. 22 illustrates a block diagram of an example network environment 1700, which may be used for implementations described herein. The network environment 1700 is merely illustrative and not intended to limit the scope of the claims. One of ordinary skill in the art would recognize other variations, modifications, and alternatives. For example, the network environment 1700 may be implemented in a distributed client-server configuration having one or more client devices in communication with one or more server systems.

In one example implementation, the network environment 1700 includes a display device such as a monitor 1710, a computer 1720, a data entry interface 1730 such as a keyboard, touch device, and the like, an input device 1740, a network interface 1750, and the like. The input device 1740 is typically implemented as a computer mouse, a trackball, a track pad, wireless remote, tablet, touch screen, and the like. Moreover, the input device 1740 typically allows a user to select and operate objects, icons, text, characters, and the like that appear, for example, on the monitor 1710.

The network interface 1750 may include an Ethernet card, a modem (telephone, satellite, cable, integrated services digital network (ISDN), etc.), an asynchronous digital subscriber line (DSL) unit, and the like. Furthermore, the network interface 1750 may be physically integrated on the motherboard of the computer 1720, may be a software program, such as soft DSL, or the like.

The network environment 1700 may also include software that enables communications over a communication network 1752 such as the hypertext transfer protocol (HTTP), transmission control protocol/Internet protocol (TCP/IP), real-time transport protocol/real-time streaming protocol (RTP/RTSP), protocols, wireless application protocol (WAP), Institute of Electrical and Electronics Engineers (IEEE) 802.11 protocols, and the like. In addition to and/or alternatively, other communications software and transfer protocols may also be used, for example Internetwork packet exchange (IPX), user datagram protocol (UDP) or the like.

The communication network 1752 may include a local area network, a wide area network, a wireless network, an Intranet, the Internet, a private network, a public network, a switched network, or any other suitable communication network, such as for example cloud networks. The communication network 1752 may include many interconnected computer systems and any suitable communication links such as hardwire links, optical links, satellite or other wireless communications links such as Bluetooth, WIFI, wave propagation links, or any other suitable mechanisms for communication of information. For example, the communication network 1752 may communicate to one or more mobile wireless devices 1756A-N, such as mobile phones, tablets, and the like, via a base station such as a wireless transceiver 1754.

The computer 1720 may include familiar computer components such as one or more processors 1760, and memory storage devices, such as a memory 1770, e.g., random access memory (RAM), storage media 1780, and system bus 1790 interconnecting the above components. In one embodiment, the computer 1720 is a PC compatible computer having multiple microprocessors, graphics processing units (GPU), and the like. While a computer is shown, it will be readily apparent to one of ordinary skill in the art that many other hardware and software configurations are suitable for use with implementations described herein. While the computer 1720 performs implementations described herein, in other implementations, any suitable component or combination of components associated with the computer 1720 or any suitable processor or processors associated with the computer 1720 may facilitate performing the implementations described herein. In various implementations, the computer 1700 may not have all of the components shown and/or may have other elements including other types of components instead of, or in addition to, those shown herein.

A memory 1770 and storage media 1780 are examples of non-transitory tangible media for storage of data, audio/video files, computer programs or program instructions, and the like. Other types of tangible media include disk drives, solid-state drives, floppy disks, optical storage media such as compact disc-read only memory (CD-ROMS) and bar codes, semiconductor memories such as flash drives, flash memories, read-only-memories (ROMS), battery-backed volatile memories, networked storage devices, cloud storage, and the like.

Although the description has been described with respect to particular embodiments thereof, these particular embodiments are merely illustrative, and not restrictive. For example, while various implementations discussed herein address facilitating table cell entries in a client-side spreadsheet via use of a novel data-selection dialog (replacing a conventional drop-down menu) with enhanced functionality for facilitating user selections, and which can efficiently handle selections from among short lists and unbounded lists (where data for the unbounded lists can be retrieved from a server, and the drop-down menu can be dynamically adjusted based on the retrieved data, including retrieved metadata), embodiments are not limited thereto. For example, other types of software UIs and accompanying components requiring data entries into fields, such as fields of a form, may employ embodiments (and variations thereof) discussed herein, without departing from the scope of the present teachings.

Various implementations need not be deployed via an Internet cloud, but instead may be hosted on an internal enterprise server on a local network. Furthermore, various implementations may be implemented as desktop software, such that the incremental updating happens on the end-user computer on which the software leveraging the dynamic planning model runs. In addition, implementations are not limited to use in conventional business applications and computing environments, and may be used, for example, by governments, universities, and other organizations to facilitate various types of planning activities.

Any suitable programming language can be used to implement the routines of particular embodiments including C, C++, C#, Java, JavaScript, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a non-transitory computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A tangible processor-readable medium including instructions executable by one or more processors, and when executed operable for:
   detecting user selection of a cell of a spreadsheet;
   accessing metadata pertaining to a web service from which a client device is to obtain either a constrained listing of user-selectable items or an unconstrained listing of user-selectable items for the selected cell of the spreadsheet;
   analyzing the metadata by the client device, to determine either the constrained listing of user-selectable items or the unconstrained listing of user-selectable items to populate a data-selection dialog that is bound or unbound;
   populating the data-selection dialog with either the constrained listing of user-selectable items or the unconstrained listing of user-selectable items in accordance with the analyzed metadata;
   displaying the data-selection dialog in response to the detecting, wherein the displayed data-selection dialog further includes:
      the unconstrained listing of user-selectable items as an unbound listing or the constrained listing of user-selectable items as a bound listing as determined from the metadata;
      one or more first UI controls for selecting items from the constrained listing of user-selectable items or the unconstrained listing of user-selectable items;
      one or more second UI controls for selectively sorting the constrained listing of user-selectable items or the unconstrained listing of user-selectable items in accordance with a first user-specified criterion; and
      one or more third UI controls for selectively searching the constrained listing of user-selectable items or the unconstrained listing of user-selectable items in accordance with a second user-specified criterion; and
   detecting use of one or more of: the one or more first UI controls, the one or more second UI controls, or the one or more third UI controls, and performing the corresponding selecting, selectively sorting, or selectively searching, in response thereto.

2. The tangible processor-readable medium of claim 1, wherein the data-selection dialog includes a modeless data-selection dialog, and wherein modeless data-selection dialog includes the constrained listing of user-selectable items or the unconstrained listing of user-selectable items, arranged in rows of a table.

3. The tangible processor-readable medium of claim 1, wherein the first user-specified criterion specifies sorting of the constrained listing of user-selectable items or the unconstrained listing of user-selectable items by a header of one or more columns of a table presenting the constrained listing of user-selectable items or the unconstrained listing of user-selectable items.

4. The tangible processor-readable medium of claim 3, wherein the header includes a date header, enabling sorting of the user-selectable items by date, or a name header enabling sorting of the user-selectable items by name, and resulting in an alphabetical sorting of the user-selectable items by the name.

5. The tangible processor-readable medium of claim 1, further including providing one or more fourth UI controls for triggering display of one or more advanced-search UI controls in the data-selection dialog, thereby resulting in display of an advanced-search dialog.

6. The tangible processor-readable medium of claim 5, wherein the advanced-search dialog further includes the one or more fourth UI controls for providing user options to enter multiple search criteria.

7. The tangible processor-readable medium of claim 6, wherein the advanced-search dialog further includes one or more fifth UI controls for enabling addition of one or more sixth UI controls enabling a user to specify additional search criteria, in addition to the multiple search criteria.

8. The tangible processor-readable medium of claim 1, further including:
   determining items in the constrained listing of user-selectable items or the unconstrained listing of user-selectable items by:
      obtaining data for a particular cell of the spreadsheet in accordance with the metadata, resulting in obtained data;
      using the metadata to populate the data-selection dialog with the constrained listing of user-selectable items or the unconstrained listing of user-selectable items in accordance with the obtained data and associated metadata; and
   selectively caching the obtained data for future use.

9. The tangible processor-readable medium of claim 8, further including:
   determining that a user has scrolled past retrieved data in the constrained listing of user-selectable items or the unconstrained listing of user-selectable items, and then:
   selectively retrieving additional data from the web service in accordance with the metadata; and
   augmenting the constrained listing of user-selectable items or the unconstrained listing of user-selectable items with the additional data.

10. A method for facilitating data retrieval, selection, and entry in a client-side spreadsheet, the method comprising:
   detecting user selection of a cell of a spreadsheet;
   accessing metadata pertaining to a web service from which a client device is to obtain either a constrained listing of user-selectable items or an unconstrained listing of user-selectable items for the selected cell of the spreadsheet;

analyzing the metadata by the client device, to determine either the constrained listing of user-selectable items or the unconstrained listing of user-selectable items to populate a data- selection dialog that is bound or unbound;

populating the data-selection dialog with either the constrained listing of user-selectable items or the unconstrained listing of user-selectable items in accordance with the analyzed metadata;

displaying the data-selection dialog in response to the detecting, wherein the displayed data-selection dialog further includes:

the unconstrained listing of user-selectable items as an unbound listing or the constrained listing of user-selectable items as a bound listing as determined from the metadata;

one or more first UI controls for selecting items from the constrained listing of user-selectable items or the unconstrained listing of user-selectable items;

one or more second UI controls for selectively sorting the constrained listing of user-selectable items or the unconstrained listing of user-selectable items in accordance with a first user-specified criterion; and one or more third UI controls for selectively searching the constrained listing of user-selectable items or the unconstrained listing of user-selectable items in accordance with a second user-specified criterion; and detecting use of one or more of: the one or more first UI controls, the one or more second UI controls, or the one or more third UI controls, and performing the corresponding selecting, selectively sorting, or selectively searching, in response thereto.

11. The method of claim 10, wherein the data-selection dialog includes a modeless data-selection dialog, and wherein modeless data-selection dialog includes the constrained listing of user-selectable items or the unconstrained listing of user-selectable items, arranged in rows of a table.

12. The method of claim 10, wherein the first user-specified criterion specifies sorting of the constrained listing of user-selectable items or the unconstrained listing of user-selectable items by a header of one or more columns of a table presenting the constrained listing of user-selectable items or the unconstrained listing of user-selectable items.

13. The method of claim 12, wherein the header includes a date header, enabling sorting of the user-selectable items by date, or a name header enabling sorting of the user-selectable items by name, and resulting in an alphabetical sorting of the user-selectable items by the name.

14. The method of claim 10, further including providing one or more fourth UI controls for triggering display of one or more advanced-search UI controls in the data-selection dialog, thereby resulting in display of an advanced-search dialog.

15. The method of claim 14, wherein the advanced-search dialog further includes the one or more fourth UI controls for providing user options to enter multiple search criteria.

16. The method of claim 15, wherein the advanced-search dialog further includes one or more fifth UI controls for enabling addition of one or more sixth UI controls enabling a user to specify additional search criteria, in addition to the multiple search criteria.

17. The method of claim 10, further including:

determining items in the constrained listing of user-selectable items or the unconstrained listing of user-selectable items by:

obtaining data for a particular cell of the spreadsheet in accordance with the metadata, resulting in obtained data;

using the metadata to populate the data-selection dialog with the constrained listing of user-selectable items or the unconstrained listing of user-selectable items in accordance with the obtained data and associated metadata;

selectively caching the obtained data for future use; and determining that a user has scrolled past retrieved data in the constrained listing of user-selectable items or the unconstrained listing of user-selectable items, and then:

selectively retrieving additional data from the web service in accordance with the metadata; and augmenting the constrained listing of user-selectable items or the unconstrained listing of user-selectable items with the additional data.

18. The method of claim 10, wherein constrained listing of user-selectable items or the unconstrained listing of user-selectable items is obtained by the client device determining that the selected cell is related to another cell of the spreadsheet and requesting data for the selected cell that is related to one or more attributes of the other cell.

19. The method of claim 10, wherein the first user-specified criterion for the one or more second UI controls for selectively sorting, specifies sorting of the constrained listing of user-selectable items or the unconstrained listing of user-selectable items by an alphabetical order arranged in one or more columns of a table.

20. An apparatus comprising:

one or more processors; and logic encoded in one or more tangible media for execution by the one or more processors and when executed operable for:

detecting user selection of a cell of a spreadsheet;

accessing metadata pertaining to a web service from which a client device is to obtain either a constrained listing of user-selectable items or an unconstrained listing of user-selectable items for the selected cell of the spreadsheet;

analyzing the metadata by the client device, to determine either the constrained listing of user-selectable items or the unconstrained listing of user-selectable items to populate a data- selection dialog that is bound or unbound;

populating the data-selection dialog with either the constrained listing of user-selectable items or the unconstrained listing of user-selectable items in accordance with the analyzed metadata;

displaying the data-selection dialog in response to the detecting, wherein the displayed data-selection dialog further includes:

the unconstrained listing of user-selectable items as an unbound listing or the constrained listing of user-selectable items as a bound listing as determined from the metadata;

one or more first UI controls for selecting items from the constrained listing of user-selectable items or the unconstrained listing of user-selectable items;

one or more second UI controls for selectively sorting the constrained listing of user-selectable items or the unconstrained listing of user-selectable items in accordance with a first user-specified criterion; and one or more third UI controls for selectively searching the constrained listing of user-selectable items or the unconstrained listing of user-selectable items in accordance with a second user-specified criterion; and detecting use of one or more of: the one or more first UI controls, the one or more second UI controls, or the one or more third UI controls, and performing the corresponding selecting, selectively sorting, or selectively searching, in response thereto.

* * * * *

UNITED STATES PATENT AND TRADEMARK OFFICE
CERTIFICATE OF CORRECTION

PATENT NO. : 11,354,493 B2
APPLICATION NO. : 16/692634
DATED : June 7, 2022
INVENTOR(S) : Von Tish et al.

It is certified that error appears in the above-identified patent and that said Letters Patent is hereby corrected as shown below:

In the Specification

In Column 21, Line 66, delete "in to" and insert -- into --, therefor.

In Column 23, Line 48, delete "FIG." and insert -- FIGS. --, therefor.

In the Claims

In Column 31, Line 7, in Claim 10, delete "data- selection" and insert -- data-selection --, therefor.

In Column 32, Line 50, in Claim 20, delete "data- selection" and insert -- data-selection --, therefor.

Signed and Sealed this
Twenty-second Day of November, 2022

Katherine Kelly Vidal
*Director of the United States Patent and Trademark Office*